(12) United States Patent
Strömme et al.

(10) Patent No.: US 8,920,971 B2
(45) Date of Patent: Dec. 30, 2014

(54) COMPOSITE MATERIALS INCLUDING AN INTRINSICALLY CONDUCTING POLYMER, AND METHODS AND DEVICES

(76) Inventors: Maria Strömme, Uppsala (SE); Leif Nyholm, Uppsala (SE); Albert Mihranyan, Uppsala (SE)

( * ) Notice: Subject to any disclaimer, the term of this patent is extended or adjusted under 35 U.S.C. 154(b) by 476 days.

(21) Appl. No.: 12/743,796

(22) PCT Filed: Nov. 26, 2008

(86) PCT No.: PCT/IB2008/054967
§ 371 (c)(1),
(2), (4) Date: May 19, 2010

(87) PCT Pub. No.: WO2009/069086
PCT Pub. Date: Jun. 4, 2009

(65) Prior Publication Data
US 2010/0266896 A1 Oct. 21, 2010

Related U.S. Application Data

(60) Provisional application No. 60/990,334, filed on Nov. 27, 2007.

(51) Int. Cl.
*H01M 4/02* (2006.01)
*H01M 4/66* (2006.01)
(Continued)

(52) U.S. Cl.
CPC .............. *H01B 1/127* (2013.01); *H01M 4/667* (2013.01); *H01M 4/1399* (2013.01); *H01G 9/155* (2013.01); *H01M 4/13* (2013.01); *H01M 4/661* (2013.01); *C08G 2261/3221* (2013.01); *Y02E 60/13* (2013.01); *H01M 4/139* (2013.01); *C08J 7/047* (2013.01); *H01M 2004/021* (2013.01); *H01M 10/0525* (2013.01); *Y02E 60/122* (2013.01); *D06M 15/61* (2013.01); *H01M 4/045* (2013.01); *H01M 4/137* (2013.01); *C08G 2261/94* (2013.01)
USPC ........... 429/209; 429/347; 429/301; 429/249; 521/84.1; 428/35.1

(58) Field of Classification Search
USPC ........ 429/209, 347, 483, 301, 249; 428/35, 7, 428/35.1; 521/84.1
See application file for complete search history.

(56) References Cited

U.S. PATENT DOCUMENTS 5,202,060 A    4/1993  Destryker et al.
5,352,709 A *  10/1994  Tarrant et al. ................ 521/84.1
(Continued)

FOREIGN PATENT DOCUMENTS

CN    1101161 A    4/1995
CN    1111170 A    11/1995
(Continued)

OTHER PUBLICATIONS

J. Phys. Chem. B 2003, 107, 13954-13961.*
(Continued)

*Primary Examiner* — Patrick Ryan
*Assistant Examiner* — Alex Usyatinsky
(74) *Attorney, Agent, or Firm* — Porter Wright Morris & Arthur LLP

(57) ABSTRACT

A composite material in the form of a continuous structure comprises an intrinsically conducting polymer (ICP) layer coated on a substrate, the composite material having a surface area of at least 0.1 m$^2$/g, at least 1 m$^2$/g, or at least 5 m$^2$/g. Methods of manufacturing the composite material comprise coating the substrate with a layer of the intrinsically conducting polymer. Electrochemical or electrical devices comprise at least one component formed of the composite material.

26 Claims, 15 Drawing Sheets

(51) Int. Cl.
*H01M 4/1399* (2010.01)
*H01G 9/00* (2006.01)
*H01M 4/13* (2010.01)
*H01M 4/139* (2010.01)
*C08J 7/04* (2006.01)
*H01M 10/0525* (2010.01)
*D06M 15/61* (2006.01)
*H01M 4/04* (2006.01)
*H01B 1/12* (2006.01)
*H01M 4/137* (2010.01)

(56) References Cited

U.S. PATENT DOCUMENTS

| | | | |
|---|---|---|---|
| 5,567,355 A * | 10/1996 | Wessling et al. | 252/500 |
| 6,265,615 B1 | 7/2001 | Kaner et al. | |
| 7,789,110 B2 * | 9/2010 | Marini | 141/38 |
| 2005/0048405 A1 | 3/2005 | Lelental et al. | |
| 2005/0287208 A1 * | 12/2005 | Kumar et al. | 424/464 |
| 2006/0102869 A1 | 5/2006 | Cavaille et al. | |
| 2006/0144543 A1 | 7/2006 | Aho et al. | |
| 2006/0275660 A1 | 12/2006 | Zama et al. | |
| 2006/0286434 A1 * | 12/2006 | Evans et al. | 429/42 |
| 2007/0254216 A1 | 11/2007 | Hara et al. | |

FOREIGN PATENT DOCUMENTS

| | | |
|---|---|---|
| CN | 1842543 A | 10/2006 |
| CN | 1880526 A | 12/2006 |
| CN | 1965018 A | 5/2007 |
| CN | 101003683 A | 7/2007 |
| CN | 101070672 A | 11/2007 |
| EP | 0267392 A1 | 5/1988 |
| EP | 0667413 A1 | 8/1995 |
| EP | 1071149 A2 | 1/2001 |
| JP | H2-500918 A | 3/1990 |
| JP | H4-239521 A | 8/1992 |
| JP | H9-216952 A | 8/1997 |
| JP | 2004-190027 A | 7/2004 |
| JP | 2004-204380 A | 7/2004 |
| JP | 2006-014562 A | 1/2006 |
| JP | 2006-193858 A | 7/2006 |
| JP | 2006-522233 A | 9/2006 |
| JP | 2006-310384 * | 11/2006 |
| JP | 2006-310384 A | 11/2006 |
| JP | 2006-351289 A | 12/2006 |
| RU | 2265257 C2 | 11/2005 |
| WO | 89/01015 A1 | 2/1989 |
| WO | 89/02155 A1 | 3/1989 |
| WO | 89/11648 A1 | 11/1989 |
| WO | WO04/001888 * | 12/2003 |
| WO | 2005/021597 A1 | 3/2005 |
| WO | 2005/090446 A1 | 9/2005 |

OTHER PUBLICATIONS

J. Phys. Chem. 1988, 92, 7002.*
Seung Lee, Han; Hong, Juan "Chemical Synthesis and characterization of polypyrrolle coated on porous membranes and their electrochemical stability" Synthetic Metals (2000), 113(1-2), 115-119. (CAS Abstract).*
Elyashevich, G. K.; Kuryndin, I. S.; Smirnov, M. A.; Bobrova, N. V. "The effect of a porous polyethylene matrix on the structure and mechanical and deformational properties of electroactive composites" Mechanics of Composite Materials (2006), 42(6), 577-586.*
Plesis et al Phys. Stat. Sol. (a) 204, No. 7, 2319-2328 (2007).*
Synthetic Metals (2000), 113(1-2), 115-119.*
Mihranyan et al, J. Phys. Chem. B, 112:12249-12255, published on the Web Sep. 6, 2008.
The Condensed Chemical Dictionary, 10th Edition, Hawley, Editor, Van Nostrand Reinhold Company, New York, NY (1981), pp. 640 and 1078.
Official Action from corresponding CN 200880117833.9, dated Apr. 1, 2013, and English translation thereof.
Lee et al, Synthetic Metals, 113(1-2):115-119 (2000).
Nyholm et al., Advanced Materials, 23:3751-3769 (2011).
Deinhammer et al., Journal of Electroanalytical Chemistry, 387:35-46 (1995).
Official Action dated Dec. 10, 2013 from corresponding Japanese application No. 2010-535493, and an English translation thereof.
Official Action dated Sep. 18, 2013 from corresponding European application No. 08854650.2.
Official Action dated Dec. 10, 2013 from corresponding Chinese application No. 200880117833.9, and an English translation thereof.

* cited by examiner

COMPOSITE MATERIALS INCLUDING AN INTRINSICALLY CONDUCTING POLYMER, AND METHODS AND DEVICES

RELATED APPLICATIONS

The present application is a 371 of PCT/IB2008/054967 filed Nov. 26, 2008 and claims priority under 35 U.S.C. §119 to U.S. Application Ser. No. 60/990,334 filed Nov. 27, 2007.

FIELD OF THE INVENTION

The present invention is directed to composite materials including an intrinsically conducting polymer, and to methods of manufacturing the composite materials, to methods of using the composite materials, and to devices employing the composite materials.

BACKGROUND OF THE INVENTION

Ever since the conductive properties of acetylene and its analogues were described in the late 1950's, these types of compounds have attracted much attention for their electroconducting properties. See Heinze et al, *Organic Electrochemistry*, Marcel Dekker, New York, 2001; Lange et al, *Anal. Chim. Acta*, 614:1 (2008); Cosnier, *Anal. Lett.*, 40:1260 (2007); Guimard et al, *Prog. Polymer Sci.* 32:876 (2007); Geetha et al, *Anal. Chim. Acta*, 568:119 (2006); Mermilliod et al, *J. Electrochem. Soc.*, 133:1073 (1986); Kaynak et al, *J. Appl. Polymer Sci.*, 54:269 (1994); Cen et al, *Biosensors & Bioelectronics*, 18:363 (2003); Lopez-Crapez et al, *Clin. Chem.*, 47:186 (2001); Jager et al, *Science*, 290:1540 (2000); and Pawliszyn, *Solid-Phase Microextraction: Theory and Practice*, Wiley VCH, New York (1997). The conductive properties of various electronically conducting polymers, such as polyners derived from acetylene, and polymers such as polyphenylene (PPh), polyphenylene sulfide (PPhS), polyphenylene vinylene (PPhV), polypyrrole (PPy), polythiophene and polyaniline (PANI), commonly referred to as intrinsically conducting polymers (ICPs), have been investigated throughout the years. Some of these materials have been found to exhibit excellent conductivities but poor stabilities and/or processabilities, whereas others have been found to be less conductive but stable. Polypyrrole and polyaniline are two of the most promising currently known conductive polymers due to their reasonably high conductivities, good stabilities in the oxidized state, and ease of processing.

There are two main groups of applications for these polymers:

| Based on Conductivity | Based on Electroactivity |
|---|---|
| Electrostatic materials | Molecular electronics |
| Conducting adhesives | Electric displays |
| Electromagnetic shielding | Chemical & Biochemical sensors |
| Printed circuit boards | Batteries and supercapacitors |
| Artificial nerve tissue | Drug release systems |
| Antistatic clothing | Optical computers |
| Piezoceramics | Ion exchange membranes |
| Diodes and transistors | Electromechanical actuators |
| Aircraft structures | "Smart" structures and switches |

Polypyrrole (PPy) is one of the currently preferred conductive polymers due to its high electrical conductivity, facile synthesis both in aqueous and organic media, and relatively good stability in its oxidized state. During polymerization, anions in the electrolyte solution become incorporated in the polymer film to maintain the charge balance. The presence of these so-called dopant ions greatly influences the properties of the film. It is generally conceived that both anions and cations as well as accompanying water can move in or out of the polymer film upon its oxidation and reduction. If a small anion with high mobility is incorporated into a polymer film as a dopant during the polymerization, it will be expelled when the polymer is reduced. By doping the film with large anions with low mobilities, one can reversibly absorb and desorb cations which then move to maintain the electroneutrality. Various biologically active entities, such as enzymes (see Foulds et al, *Anal. Chem.*, 60:2473-2478 (1998); and Rajesh et al, *Curr. Appl. Phys.*, 5:184-188 (2005)), antibodies for immunosensors (see Xiao et al, *Biosensors and Bioelectronics*, 22(12):3161-3166 (2007)), or metal complexing entities (see Fabre et al, *Coord. Chem. Rev.*, 178-180; 1211-1250 (1998)), can likewise be incorporated into PPy films to enable highly specific molecular and/or ionic recognition and separation. This phenomenon lays the foundation for various applications of PPy films in, e.g., ion exchange membranes and separation.

The Kaner et al U.S. Pat. No. 6,265,615 describes the use of polyaniline films for separation of optically active isomers of amino acids and pharmaceutically active ingredients. PPy composite materials were also investigated for enantioselective separation of amino acids (see Pich et al, *Polymer*, 47(19): 6536-6543 (2006)). Further, the properties of PPy were shown to be useful in various devices for gas, chemical vapor, or moisture detection (Collins et al, *Synth. Met.*, 78:93-101 (1996); and van de Leur et al, *Synthetic Metals*, 102:1330-1331 (1999)). The applications of conductive polymer composites are numerous, as the cited publications demonstrate, and many more uses will certainly appear in the future.

Functionalization with PPy of various natural and artificial polymers has also been described, including wool (Johnston et al, *J. Appl. Phys.*, 6:587-590 (2006)) and textiles (Wu et al, *Synthetic Met.*, 155:698-701 (2005)). Cellulose has been demonstrated to exhibit high affinity for, e.g., PPy or PANI, and that cellulose fibers therefore can be coated with these materials (Johnston et al, *Synthetic Met.*, 153:65-68 (2005)). Further, the inclusion of small amounts of microcrystalline cellulose (MCC) was found advantageous as it significantly improves the mechanical properties of conductive polymers which otherwise are brittle (van den Berg et al, *J. Mater. Chem.*, 27:2746-2753 (2007)).

Various technologies have developed a need for lightweight materials, flexible materials, and inexpensively produced materials that can be used as electrodes, for example, in sensors, batteries, extraction processes and the like. There is likewise a strong demand for new inexpensive ion exchange techniques for the processing of solutions containing various biologically interesting species, both on the micro and macro scale. Many of the currently employed ion exchange and separation techniques are time-consuming and labor intensive as they require large volumes of eluents for effective operation. These eluents are often expensive and often contain toxic reagents which need to be handled with care and discarded after use in an environmentally friendly fashion. Therefore, rapid and effective separation techniques utilizing a minimum of eluents are highly interesting. A promising alternative is electrochemically controlled ion exchange or electrochemically controlled solid-phase extraction techniques (see Gbatu et al, *Anal. Commun.*, 36:203 (1999); and Liljegren et al, *Analyst*, 127:591 (2002)) which utilize the ion exchange properties of electronically conductive polymers. The latter techniques have the advantage that the ion exchange properties of the materials can be controlled merely using an electrical potential, enabling absorption and desorption of ions and polar neutral species in a controlled way by simply changing the applied potential of the polymer or the redox potential of the solution in contact with the material. Ion intercalation in electrode materials composed of electronically conductive polymers in energy storage devices is governed by similar processes as those involved in the ion exchange discussed above, with the difference that in the energy storage applications, the process of charge transfer and ion exchange is utilized to power electrical appliances rather than to extract or separate chemical compounds. Non-metal, lightweight, flexible, environmentally friendly electrode materials are of particular interest in energy storage devices.

Previous designs of electrochemically controlled ion exchange and solid-phase microextraction devices have been based on the deposition of a PPy film on metal electrodes wherein the ion absorption capacity was generally manipulated by controlling the thickness of the film. See, for example, WO 89/11648 of Biosyn R Corp. It is well-known that conductive polymer films can be electrochemically synthesized on the surface of an electrode. As the surface area of the electrode materials commonly used have been relatively small (i.e. on the order of $cm^2$), mainly due to the use of electrode materials commonly used in electrochemical applications, the capacity of the polymer films has been modified by altering the thickness of the film.

Alternatively, films have been polymerized based on a chemical process involving a chemical oxidizing agent. Whereas electrodes with thick PPy coatings easily can be manufactured, their functionality with respect to absorption and desorption of ions and polar neutral species will generally be improved only to a limited extent by increasing the thickness of the polymer coating. This is because the absorption and desorption are mass-transport limited processes and the transport of ions and polar species relatively quickly becomes limited to the outermost layer of the film (see Liljegren et al, *Analyst*, 127:591 (2002)), especially for large species.

Several attempts have been made in the past to produce energy storage devices consisting entirely of lightweight components (Song et al, *Adv. Mater.*, 18:1764-1768 (2006)). Polypyrrole (PPy) and its composite materials have attracted much interest in this respect as promising materials for the development of energy storage devices (Grgur et al, *Electrochim. Acta*, 53:4627 (2008)). For instance, composites of PPy with lightweight graphite fibers were investigated to obtain useful electrode materials for supercapacitors (Park et al, *J. Power Sources*, 105:20 (2002)). According to Rüetschi, the determining factors for a successful battery system are the 3-E criteria: Energy-Economics-Environment (Beck et al, *Electrochim. Acta*, 45:2467 (2000); Ruetschi, *J. Power Sources*, 42:1 (1993)). While conductive polymers are environmentally friendly and cheaper than their metal counterpart electrode materials, the low specific capacity and small operating voltage range have so far been limiting for their widespread use in commercial all-polymer battery systems (Ramakrishnan, *Resonance*, 48-58 (1997)). Additionally, the short life-time of the electrodes during charge-discharge has further hindered their use as feasible electrodes for energy storage devices (Id.).

Accordingly, further developments in electronically conducting polymer (intrinsically conducting polymer) materials are desired in order to accommodate use of such materials in various applications.

SUMMARY OF THE INVENTION

It is therefore an object of the present invention to provide composite materials including intrinsically conducting polymers which facilitate use of the polymers in various devices and applications.

In one embodiment, the invention is directed to a composite material in the form of a continuous structure and comprising an intrinsically conducting polymer (ICP) layer coated on a substrate, the composite material having a surface area of at least 0.1 $m^2/g$. In an additional embodiment, the composite material has a surface area of at least 1 $m^2/g$, and in a further embodiment, the composite material has a surface area of at least 5 $m^2/g$.

In another embodiment, the invention is directed to a composite material in the form of a continuous structure and comprising an intrinsically conducting polymer (ICP) layer comprising a polypyrrole, coated on a substrate comprising a cellulose derived from *Cladophora* sp. green algae as a main component, the composite material having a surface area of at least 0.1 $m^2/g$.

In a further embodiment, the invention is directed to a method of manufacturing the composite material as described, the method comprising coating the substrate with a layer of the intrinsically conducting polymer (ICP).

In yet further embodiments, the invention is directed to an electrochemical or electrical device comprising at least one component formed of the composite material as described. Further embodiments of the invention are directed to separation or extraction methods employing a composite material as described.

The composite materials of the invention, having a continuous substrate and a high surface area, are advantageous for use in various devices and methods. In certain embodiments, the composite materials can be lightweight and/or flexible in nature. Additional features and advantages of the present invention will be apparent in view of the following detailed description. The following description, figures and examples are not to be taken in a limiting sense, but are merely included for the purpose of illustrating various aspects of the invention and selected embodiments of the invention.

BRIEF DESCRIPTION OF THE DRAWINGS

The detailed description will be more fully understood in view of the drawings, in which:

FIG. 7 shows that chloride ions move in (during the oxidation, positive current) and out (during the reduction, negative potential) of the composite. The composite size used in this particular measurement was 5 mm×3 mm×1 mm and the sample weight was 8.4 mg. The measurements were performed in a saturated NaCl solution at room-temperature. A three-electrode set-up with a platinum counter electrode and an Ag/AgCl reference electrode was used.

Figure 1:
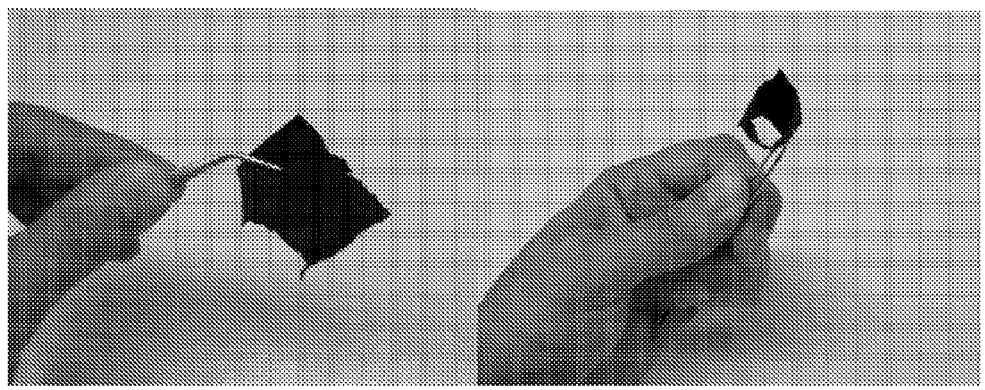
FIG. 1 shows a composite material in the form of a typical paper-like sheet produced by polymerization of polypyrrole (PPy) on *Cladophora* cellulose, which, as shown, can be foiled without impairing the integrity of paper.

The embodiments set forth in the drawings are illustrative in nature and are not intended to be limiting to the invention. Additional features and embodiments of the invention will be apparent in view of the detailed description.

DETAILED DESCRIPTION

In a first embodiment, the invention is directed to a composite material in the form of a continuous structure and comprising an intrinsically conducting polymer (ICP) layer coated on a substrate, the composite material having a surface area of at least 0.1 $m^2/g$. The term "continuous" is used herein to describe a material of any hardness or softness that has enough mechanical integrity to be handled as a free-standing unit without other supporting structures. A paper sheet is thus a continuous material whereas a powder is not. A powder may however be used to form a continuous unit. As will become clear from the present description, a powder of certain celluloses and other polymers may be an excellent starting material to form the continuous composite material of the present invention. The use of supporting structures is not excluded and such structures can be used whenever they are not adversely affecting the functionality of the composite material as disclosed herein. Additionally, the term "surface area" is used herein to describe a surface area of the composite material divided by the total weight of the composite material and is assessed from standard BET analysis of nitrogen sorption isotherms.

A composite material comprising an ICP and having a continuous structure and a high surface area can advantageously be used as a working electrode for electrochemically controlled separation, in energy storage applications, and the like. Additionally, preparing such materials to be lightweight and/or flexible increases their range of applications. While the polymerization of a continuous thin ICP film on a suitable porous, high surface area continuous substrate while preserving both the large surface area of the substrate and the functionality of the film is challenging, such is achieved according to the present invention.

More specifically, the present invention discloses a new route to improve the capacity of electrodes by increasing the specific surface area of composite materials for use in such electrodes. In one embodiment, the composite material has a surface area of at least $0.1\ m^2/g$. In an additional embodiment, the composite material has a surface area of at least $1\ m^2/g$, and in a further embodiment, the composite material has a surface area of at least $5\ m^2/g$. In yet additional embodiments, the composite material has a surface area of at least $10\ m^2/g$, at least $15\ m^2/g$, or at least $20\ m^2/g$, respectively.

One will appreciate that it is not easy to achieve polymerization of an intrinsically conducting polymer (ICP) on a high surface area, porous substrate without clogging the pores and thus obtaining an essentially non-porous low surface area composite material. According to the invention, the polymerization can be achieved either by first impregnating the substrate with an oxidant and then applying the ICP-forming monomer or vice versa. It is therefore important to use a substrate that is easily wetted by the reagents so that a continuous and uninterrupted coating is produced. Metal surfaces, e.g. stainless steel, generally dissolve or form insulating oxides on their surfaces in the presence of oxidizing agents and are therefore less suitable as substrates. Additionally, if the wettability of the substrate by the ICP-forming monomer is poor, islands of polymer may be formed instead of a continuous polymer film.

One way to increase the surface area of an ICP film is to deposit the polymer on a powdered material comprising small particles which are then formed into a continuous structure. The use of powdery ion exchangers that are not formed into a continuous structure may be problematic. For example, powders first need to be packed into columns through which liquids then can be pumped. If the particle size is below 10 micron, the back pressure in the column will generally be very high. If an electrochemically controlled ion exchanger is employed, applying the potential to a column will also not be as efficient as if the contact was made directly to a solid material. Powdery ion exchangers are likewise not convenient whenever so-called batch wise purification is of concern (wherein the absorbent is put directly into a sample fluid to be ion exchanged).

In one embodiment, the substrate of the composite material comprises a polymer or a geopolymer as a main component. Generally, the main component will comprise at least about 50% by weight of the substrate. Geopolymers are ceramic-like, inorganic polymers, i.e., based on silica, not carbon, that are produced at low temperatures. Examples of substrate materials suitable for use according to the present invention include, but are not limited to, i) cellulose, including microfibrillated cellulose and cellulose of algal and bacterial origin, ii) dextran, iii) agarose, iv) polymers based on monomers such as styrene, propylene, acrylic acid, acryl amide and divinylbenzene, including polymers and copolymers of one or more of such, v) geopolymers such as those based on metakaolin or Halloysite, and other aluminosilicates. Microfibrillated cellulose is described by Henriksson, *Cellulose nanofibril, Networks and composites, Preparation, structure and properties*, PhD thesis KTH, Sweden 2008, ISSN 1654-1081, ISBN 978-91-7178-849-8, and references therein, and is obtained by intensive high-shear homogenization of land-plant cellulose comprising long fibers to form gels. When dried, such microfibrillated cellulose forms a powdery material of relatively high surface area. Such microfibrillated cellulose comprises long fibers and has typically not been purified through acidic hydrolysis (mild enzymatic hydrolysis is, however, often used to produce microfibrillated cellulose). A powder of microfibrillated cellulose is a good starting material for forming a high surface area continuous substrate to be used according to the present invention. The present examples demonstrate the formulation of continuous structures from a powder substrate starting material.

The substrate may be formed of one single material or may comprise a composition of several materials. Additional materials that do not adversely affect the properties of the substrate may be included. Non-limiting examples of materials that may be included in the substrate comprise carbon nanotubes and other types of carbon nanomaterials, as well as other metals, ceramics and oxides including, but not limited to, $Al_2O_3$, $SiO_2$, $TiO_2$, $SnO_2$, $WO_3$, vanadium oxides, nickel oxides, graphite, carbon black, glassy carbon, pyrolytic carbon, and diamond. Optionally, the substrate may be made conductive. For example, the substrate can be made conductive by functionalization with, for example, carbon nanomaterials or by depositing a thin conducting layer onto the substrate. Any deposition method that does not adversely affect the functionality of the substrate, e.g., evaporation, chemical vapor deposition techniques such as atomic layer deposition, or physical vapor deposition techniques such as sputtering, may be employed. Other methods for rendering the substrate conductive may be employed as well.

In a specific embodiment, the substrate comprises cellulose as a main component. In a further embodiment, the cellulose is selected from algal cellulose and bacterial cellulose. In a more specific embodiment, the algal cellulose is derived from filamentous marine algae and/or spherical marine algae. In another embodiment, the algal cellulose is derived from Cladophorales order or Siphonocladales order, or is derived from the algae *Cladophora, Chaetomorpha, Rhizoclonium, Microdyction, Valonia, Dictyosphaeria, Siphonocladus* or *Boergesenia*. In another embodiment, the substrate comprises bacterial cellulose derived from *Acetobacter xylinum*. In a more specific embodiment, the cellulose is derived from *Cladophora* sp. green algae.

In a specific embodiment, the substrate has a high crystallinity index, i.e., a crystallinity index of at least 50%. In further embodiments, the substrate has a crystallinity index of at least 60%, at least 70%, at least 75%, at least 80%, at least 85%, and at least 90%, respectively. As used herein, the term "crystallinity index" defines the crystallinity of a material. For celluloses, the crystallinity index can be assessed as described in Mihranyan et al, *European J. of Pharm. Sci.*, 22:279-286 (2004) and references therein. For other substrate materials, the crystallinity index should be assessed in a similar manner as the relative crystallinity of the material as compared to its monocrystalline counterpart. The location of the intensities in X-ray diffractograms to be used in this assessment can be determined by one skilled in the art. In a specific embodiment, a substrate of high crystallinity is formed of a *Cladophora* cellulose or a *Acetobacter xylinum* cellulose powder, and the crystallinity index is at least 60%, preferably at least 70%, more preferably at least 80%, at least 85%, or at least 90%.

In another embodiment, the composite material is inert and can withstand a wide rage of pH values, typically, but not exclusively, between 2 and 11, while maintaining its mechanical integrity. Non-limiting examples of substrates for such a composite material are the high crystallinity celluloses derived from *Cladophora* algae or *Acetobacter Xylinum*, as well as geopolymers.

In one embodiment, the substrate has a surface area at least 1 $m^2/g$, at least 5 $m^2/g$, at least 10 $m^2/g$, at least 20 $m^2/g$, or at least 40 $m^2/g$. In order to assess the surface area of the substrate, the substrate should be formed in a process prior to formation of the ICP layer, for example as described in Examples 1 and 4 herein where the substrates comprise a *Cladophora* cellulose and a microfibrillated cellulose substrate, respectively.

The ICP layer is suitably formed from a derivative of acetylene, or from polyphenylene (PPh), polyphenylene sulfide (PPhS), polyphenylene vinylene (PPhV), polypyrrole (PPy), polythiophene, or polyaniline (PANI), or a mixture thereof, although any other intrinsically conductive polymer may also be employed. In specific embodiments, the ICP layer coated on the substrate has a thickness less than 5 µm, less than 1 µm, less than 500 nm, less than 250 nm, or less than 100 nm, respectively. The coating layer thickness may be determined by transmission electron microscopy. For coatings with an uneven thickness, the layer thickness described above should be taken as the average thickness value.

In one embodiment, the composite materials according to the invention are manufactured by coating the substrate with a layer of the intrinsically conducting polymer (ICP). More specifically, the coating step may comprise polymerizing an ICP-forming monomer in a solution including an oxidizing agent. Examples of suitable oxidizing agents include, but are not limited to, $S_2O_8^{2-}$, $H_2O_2$, phosphomolybdate, and salts of a transition metal ion selected from the group consisting of $Fe^{3+}$, $Cu^{2+}$, $Cr^{6+}$, $Mo^{6+}$, $Ce^{4+}$, $Ru^{3+}$ and $Mn^{7+}$. The character of the anion used in the oxidizing step of forming the ICP may vary significantly and can be chosen so as to meet the desired functionality. The size of the anion determines the porosity of the polymer film (or the polymer network spacing) and can be tuned so as to obtain ion selectivity during separation. The larger the polymer network spacing, the larger the ions which can be reversibly absorbed by and expelled from the layer. The oxidizing agent may include a chloride, bromide, sulfate, phosphate, formate, carbonate, acetate, perchlorate, p-toluene sulfonate, and/or phosphomolybdate anion, and/or other anions as apparent to one of ordinary skill in the art. Further, controlled potential or current electropolymerization may be conducted to the formed ICP layer to increase the thickness of the ICP layer and/or to change its functionality. In an alternate embodiment, the coating step may comprise controlled potential or current electropolymerization of ICP-forming monomer carried out directly on an electronically conducting substrate. This step may be followed by polymerizing an ICP-forming monomer in a solution including an oxidizing agent as described, i.e., after the electropolymerization step.

According to either of these described manufacturing methods, the conductivity of the ICP layer may be enhanced by polymerizing ICP-forming monomer in the presence of a surfactant. Suitable surfactants will be apparent to one of ordinary skill in the art and include, but are not limited to, alkyl sulfonates, alkyl aryl sulfonates, and the like, for example, sodium dodecylbenzyl sulfonate, sodium alkylnaphthalene sulfonate, sodium alkyl sulfonate, etc. During polymerization as described, the large surface area of the substrate is substantially preserved and a continuous coating along the pore walls is obtained without bridging between adjacent pore walls or eventual clogging. The large surface area substrate is well wetted by the ICP monomer according to the present methods so that upon polymerization of the monomer, a thin, continuous layer of ICP is created without impairing the high surface area structure of the substrate.

In one specific manufacturing embodiment, the polymerization of the ICP is achieved via a chemical process suitable for scale-up in industry. Specifically, polypyrrole-based composite material is obtained by polymerization of pyrrole in the presence of iron(III) chloride on a cellulose substrate derived from *Cladophora* sp. algae. The material is doped with chloride ions and molded into paper sheets. Other examples of production are given in Examples 1, 4, 18, 19 and 21. Another specific manufacturing embodiment employs a composite with a geopolymer substrate according to the present invention, such as those based on e.g. metakaolin or Halloysite. Additional production steps are typically required, including a step of dissolving the aluminosilicate source in, e.g., a NaOH solution before introducing the ICP monomer. In one embodiment of the present invention, the monomer is preferably added following dissolution of the aluminosilicate source and thoroughly mixed with the aluminosilicate source solution after which the oxidizing agent is added. Alternatively, the ICP monomer and oxidizing agent are added at a later stage during the geopolymer formation depending on the desired structure of the end product.

The resultant composite material may be molded into paper sheets which possess significant mechanical strength and can be foiled, folded, bent, or twisted without impairing the material's integrity. In one embodiment, the ICP layer is stable upon storage and in a specific embodiment it can be repeatedly used while preserving the functionality of the layer by either changing the redox potential of the layer or, alternatively, the pH or the redox potential of a solution in contact with the layer.

Generally, the composite materials may be employed in various devices and methods wherein an electrochemically controlled layer is desired. The substrate advantageously provides a continuous substrate for the conducting electroactive layer. The invention is therefore further directed to electrochemical or electrical devices comprising at least one component formed of the composite material as described herein, to an electrochemical circuit comprising an electrochemically controlled layer formed of the composite material as described herein, to an energy storage device comprising a battery or a supercapacitor formed of the composite material as described herein, to an electromechanical actuator comprising an electrochemically controlled layer formed of the composite material as described herein, and to methods employing any of such. Numerous specific embodiments of these aspects of the invention will be apparent to those of ordinary skill in the art in view of the present disclosure. Nonlimiting examples are described herein.

For example, the composite material of the invention is useful in solid phase extractions, ion-exchange membranes, separation techniques, isolation of optically active isomers, waste-water purification, gas and moisture detectors and sensors, diagnostic devices, haemodialysis, electromechanical actuators, batteries, capacitors, supercapacitors, actuators, and drug delivery systems. The composite material is stable and retains its electrochemical functionality after having been used repeatedly, for example, in applications related to energy storage such as battery and supercapacitor applications, and in electrochemically controlled extraction, ion exchange, ion separation, ion intercalation, and purification. The composite material may be used as an electrode material in various battery and supercapacitor applications, including those entirely comprising non-metal components, wherein the lightweight, flexibility, compactness, and environmental friendliness of the composite are properties that make it superior compared to other materials described in the prior art. The composite material can alternatively be employed in applications wherein it is a disposable and designed for only one electrochemically controlled process step, for example, in diagnostics and sensing in which a charged species is captured by the composite material and detected, in a redox modified set-up designed for release of ions or pharmaceutically active ingredients into a solution or in vivo, in a low cost, environmentally friendly primary battery (i.e. a non-chargeable battery), or to extract a type of ion or several types of ions from a solution when the solution is too contaminated to enable a subsequent full cleaning of the composite.

The composite materials will, in certain embodiments, allow miniaturization of various devices. Importantly, the high surface area of the composite materials of the invention provides functionality of the device after miniaturization and maintains a high capacity. Non-limiting examples of such include miniaturized set-ups for extraction, ion exchange, ion intercalation, and separation, as well as miniaturized electrodes for energy storage of high charge storage capacity, additionally providing electrodes that are lightweight and environmentally friendly.

Simultaneously as the requirement for miniaturized materials with high capacity to extract or store charged species increases, the need for materials that are easily made in large formats has increased as well. The present invention, in certain embodiments, satisfies this demand as well. Non-limiting examples of such devices in which the present composite materials are suitable for use include large scale energy storage devices including batteries and supercapacitors, as well as water purification systems and actuators. Lithium ion battery materials hitherto disclosed in the prior art are typically difficult and expensive to produce in large formats. The composite materials of the present invention can easily be integrated in large format devices, including those for energy storage applications and extraction/purification devices, typically at a relatively low cost.

The applications of the composite material disclosed herein are numerous and those listed below should not be taken in a limiting sense.

In one embodiment, the composite material comprises a high surface area and high crystallinity cellulose matrix composed of intertwined cellulose nano-fibers coated by a conductive polymer, e.g. PPy, in such a way that the large surface area and the fine pore structure of the cellulose matrix is retained. An example of how to achieve this structure is given in Example 1. One prerequisite for achieving such a structure lies in the good wettability of the fibers with respect to pyrrole. This structure can thus not be readily achieved with substrates that do not have this intrinsic property. In the described example, the crystallinity index of the material that is used to form the continuous substrate, e.g., but not limited to, a *Cladophora* cellulose or a *Acetobacter xylinum* cellulose powder, should preferably be at least 60%, preferably at least 70%, more preferably at least 80%, even more preferably at least 85%, most preferably at least 90%.

In some applications, a cellulose substrate material of very high surface area (comparable to that of industrial adsorbents), i.e. higher than 10 $m^2/g$ or, in a specific embodiment, higher than 50 $m^2/g$, is useful. In some of these applications, the substrate preferably also exhibits a high crystallinity. It is believed that high crystallinity of native cellulose of algal and bacterial origin is of importance as the cellulose fibers are less reactive and can withstand treatments with strong acids. The latter enables one to retain the fibrous nano-structure of cellulose even when using an acidic hydrolysis step during purification, which otherwise produces significant reduction in the fiber length and marked DP (Degree of Polymerisation) reduction of ordinary land-plant cellulose. The high degree of crystallinity of cellulose is advantageous not only due to the ease of purification during manufacturing via acidic hydrolysis but also in various applications wherein a high chemical resistivity of the composite material is desirable. For instance, the ICP composite material can be used in various separation techniques wherein valuable molecules/ions can be extracted or separated either by changing the redox potential of the ICP film or, alternatively, the pH or the redox potential of the solution in contact with the film. In some applications, it is therefore desirable to have a cellulose substrate that can withstand pH changes within a broad pH range (e.g. pH 2 to 11), as previously described.

A cellulose powder of such high crystallinity can typically only be extracted from nature, e.g. as algal or bacterial cellulose, and the degree of crystallinity can not be artificially increased to such an extent by chemically treating a cellulose material of lower degree of order. The crystallinity index of ordinary microcrystalline cellulose derived from land plants usually does not exceed 82%, as measured by XRD, whereas the crystallinity index of cellulose of algal origin is typically above 90%. Further, the specific surface area of typical microcrystalline cellulose is merely about 1 $m^2/g$. Cellulose powder of algal origin has been reported to have specific surface area values reaching up to 95 $m^2/g$. The large surface area of cellulose advantageously serves as a substrate for PPy polymerization. Due to the affinity of Py monomers for cellulose nanofibers, a homogenous and uninterrupted layer of polymer coats the individual fibers and the large surface of cellulose remains virtually intact according to the production procedure of the composite material as presently disclosed. Relatively thin polymer coatings on a large surface area substrate are sometimes more advantageous than thick polymer coating over a small surface area because the absorption and desorption of various charged species under electrochemical control often are mass transport-controlled. Therefore, the diffusion of ions (especially large ions) is often limited to the outermost layer of polymer whereas the bulk of the polymer film remains inaccessible. The formation of a thin continuous polymer film over a large surface area produces a material with high ion sorption capacity. In fact, the capacity of the material is so high that miniature samples (rectangular paper sheets approx. 8 mm×5 mm×1 mm thick and approx. 10 mg in weight) are preferably used to characterize the electrochemical properties of the composite materials of the invention in standard lab set-ups, for example, in measuring cyclic voltammetry and chronoamperometry properties, to avoid a situation where the current merely is limited by the resistance of the electrolyte solution.

According to one embodiment of the present invention, a cation exchange material is prepared by oxidizing the ICP monomer, e.g., but not limited to pyrrole, using a solution of an oxidizing agent, such as, but not limited, to Fe(III), in which a sufficiently large anion, such as, but not limited, p-toluene sulfonate or polystyrene sulfonate, is present as the counter ion (i.e., dopant ion). In this process, large anions become immobilized into the ICP layer and charge compensation during the oxidation and reduction of the ICP therefore involves cations rather than anions. Alternatively, in order to obtain a cation (rather than an anion) exchanging material, electrodeposition of an additional layer of ICP can be carried out on the ICP initially formed by the oxidation of the ICP monomer in the presence of an oxidizing agent. In the electrodeposition step, a large anion such as, but not limited to, p-toluene sulfonate, polystyrene sulfonate or phosphomolybdate is present in the electropolymerization solution. This causes the large anions to be trapped within the ICP so that cations must be extracted and desorbed when the ICP is reduced and oxidized, respectively.

One embodiment of the present invention relates to the use of the composite material as an electrochemical ion-exchange membrane. In a specific embodiment, the composite is used to separate anionic substances from liquid media by varying the electrochemical potential of the composite. In another specific embodiment, the composite is used as an ion-exchange membrane for separation of cationic species. For this application, an additional layer of ICP of the composite may e.g. be electropolymerized in the presence of large immobile anions such as, but not limited, p-toluene sulfonate or polystyrene sulfonate. Non-limiting examples of such cations to be separated or exchanged are $Mg^{2+}$, $Ca^{2+}$, $Na^+$, $K^+$, $Ba^{2+}$, $Cu^{2+}$, $Ni^{2+}$, $Zn^{2+}$, $Pb^{2+}$ and $Cd^{2+}$. An additional specific embodiment of the present invention relates to desalination of solutions containing biologically active substances, such as, but not limited to, proteins, antibiotics, or hormones. In these applications, two or several ICPs with anion and cation exchanging capacities, respectively, may be repeatedly used to remove salt from the solutions. The ICPs are produced, for example, as described in conjunction with Examples 1, 2 and 6.

A further specific embodiment of the present invention relates to the use of the composite for removal of acids/salts from food products, e.g., natural fruit juices, whey milk, or soy sauce. In these applications, two or several ICPs with anion and cation exchanging capacities, respectively, may be repeatedly used to remove salt from the solutions. The ICPs may be produced as described in conjunction with Examples 1, 2 and 6.

Yet another specific embodiment of the invention disclosed herein relates to the use of the composite for removal of organic acids from fermentation broth. In these applications, ICPs with anion exchanging capacities, produced as described in conjunction with Examples 1 and 2 may be used.

Another specific embodiment of the invention disclosed herein specifically targets direct electrochemically assisted separation of amino acids, peptides and proteins including, but not limited to, optically active isomers. In this application, the composite material, which may be produced as described in conjunction with Examples 1, 2 or 6, can be employed as a working electrode in a three-electrode setup in a flow cell. The potential of the working electrode can be controlled in order to control the interaction between the species to be separated and the electrode.

A further embodiment of the invention disclosed herein targets separation of nucleotides, single stranded DNA, and/or double-stranded DNA. In this application the composite material, which is produced e.g. as described in conjunction with Examples 1, 2 or 6, can be employed as a working electrode in a three-electrode setup in a flow cell. The potential of the working electrode can be controlled in order to control the interaction between the species to be separated and the electrode.

One embodiment of the invention disclosed herein relates to the use of the composite material in various molecular recognition devices. In this application, the composite material, initially produced e.g. as described in conjunction with Examples 1, 2 or 6, can be cycled in a solution containing a species, e.g. but not limited to an antibody or DNA, that can be taken up by the composite as a result of a change in its redox state. Molecules in the sample can then bind specifically to the species included into or onto the surface of the composite.

A specific embodiment relates to biosensors for medical diagnostics utilizing antigen-antibody reactions by doping the polymer film of the composite material with chemical entities which can specifically bind to either of the components. A further specific embodiment relates to biosensors for monitoring sugar levels in biological fluids (blood, urine) utilizing glucose-oxidase immobilized polymer films as the ICP layer according to the present invention. In this application, the enzyme (i.e. glucose oxidase) is immobilized on the PPy to yield a large surface area amperometric sensor based on the kinetically controlled oxidation of glucose in which the PPy film acts as a conducting substrate. The sensor may also include redox polymers facilitating the electron transfer between the enzyme and the PPy layer.

Another specific embodiment utilizes the change of conductive properties of the composite in the presence of moisture, gases or organic volatile entities in various gas sensor devices. In this application, the composite material, initially produced e.g. as described in conjunction with Examples 1 or 2, may be utilized as a sensor based on the change in the conductivity of the composite as a result of its exposure to moisture, gases or volatile organic compounds affecting the conductivity of the composite. The conductivity of the composite is measured by measuring the resistance between two electrodes both in contact with a layer of the composite.

A further embodiment involves the use of the composite as an electrochemically controlled solid phase microextraction device. In this application, the composite material, initially produced e.g. as described in conjunction with Examples 1, 2 or 6, is used as a working electrode in a three-electrode setup to extract anions or cations after which the electrode is transferred to a new solution containing, e.g., 0.1 M NaCl. The extracted species are then desorbed by reducing or oxidizing the composite. The working electrode with the composite can be shaped into a needle or a thin layer cell in combination with the counter and reference electrodes to allow extraction and desorption in small volumes of solution.

One embodiment of the invention disclosed herein relates to an electrochemically controlled ion-exchange membrane material for haemodialysis, i.e., separation of toxic water-soluble waste products of human metabolism in patients with chronic kidney failure. The principle of haemodialysis usually employs diffusion of solutes present in blood across a semipermeable membrane. The fluid removal is achieved through ultrafiltration via altering the hydrostatic pressure of the dialysate compartment and causing free water and some dissolved solutes to move across a membrane along a created pressure gradient. The dialysis procedure is a time-consuming process usually performed at hospitals. The composite material according to the present invention used as an ion-exchange membrane material acts not only as an ultrafiltration medium (due to its large surface area and, in certain embodiments, fibrous structure) but also as an electrochemically controlled ion-exchanger. The combination of this type of membrane with conventionally used semipermeable filters improves the efficiency of toxic waste removal from blood and also reduces the time of the procedure. Overall, this leads to the possibility of building compact home-based haemodialysis systems for short daily use.

Another embodiment of the present invention pertains to the use of the composite material as an electromechanical actuator based on the volume change of the material resulting from the incorporation and removal of ions into the material. In this application, a composite material prepared e.g. as outlined in Example 1, 2 or 6 is used to give rise to a change in the volume of a compartment with a small volume thus exerting pressure on the walls of this compartment. This device can, for example, be used as a valve in miniaturized flow systems or as an electrochemically controlled and removable stent for the expansion of an artery.

A further embodiment of the invention disclosed herein relates to the use of the composite material as electrode material in energy storage devices. Sheet form paper-like batteries provide several benefits compared to more conventional battery designs as these devices are thin, flexible, mechanically robust, lightweight, non-metal, fully recyclable, and environmentally friendly. Paper-like energy storage devices have the advantage as they can be integrated into miniaturized niche products such as paper-based displays, smart packaging, smart textiles, or miniaturized medical devices. Another attractive alternative includes manufacturing of large devices, e.g. for household warming, portable large scale appliances, etc. since sheet paper-like electrodes of several square meters in area can be manufactured easily according to the present invention. The low specific capacity and the short life-time of conventional electrodes during charging-discharging have significantly hindered the use of PPy-based electrodes as feasible electrodes for energy storage devices in the past. These hurdles are overcome by the invention disclosed herein through utilization of the relatively large specific surface area substrates, and in specific embodiments, cellulose substrates, and thin homogeneous uninterrupted functional coatings with conductive polymers. Compared to many other high surface area substrate materials, the availability, ease of processing and scale-up, as well as the cost-effectiveness of the cellulose substrates, make ICP composites with cellulose substrates, according to several embodiments of the present invention, materials of choice for manufacturing lightweight, thin, and environmentally friendly energy storage devices.

The electrode material disclosed herein is functional in energy storage devices wherein it can be used as either one of the electrodes or as both the cathode and anode materials. In the simplest of designs, the single electrochemical cell comprises two pieces of ICP composite immersed in an electrolyte solution. Alternatively, the ICP electrodes are separated by an electrolyte gel or permeable solid phase material impregnated with electrolyte solution. In a specific embodiment, the ICP electrodes are separated by a sheet of ordinary paper or filter paper impregnated with electrolyte solution, e.g., as described in Example 23. Several electrochemical cells can be stacked to increase the energy output as desired. In certain applications, water-based systems may preferably be used to satisfy the environmental requirements. In other applications, non-water based systems may be preferable. Non-limiting examples of such applications are for use in vehicles in extremely cold (non-freezing requirement) or hot (non-boiling requirement) climates, in space applications, and in applications where a larger open circuit potential than that available in an aqueous electrolyte is needed. It is also possible to employ nonaqueous electrolytes (e.g., but not limited, to ethyl carbonate and diethyl carbonate) containing lithium salts (e.g. but not limited to $LiPF_6$ or $LiClO_4$) in combination with electrodes based on layers of, e.g. but not limited to, metals or metal oxides (e.g. but not limited to, Ag, $SnO_2$, $Sb_2O_3$) coated on the composite.

One embodiment of the present invention relates to the use of the composite material as electrodes in a battery based on stacks of a plurality of pairs of composite electrodes. The composite material may be prepared e.g. as outlined in Example 1, 2 or 6 and the electrolyte used in the battery can be either be aqueous or nonaqueous containing, e.g., but not limited to, NaCl, $NaNO_3$, $LiPF_6$ or $LiClO_4$.

One embodiment of the present invention relates to the use of the composite material in electrodes in a battery with electrodes comprising composites based on two different conducting polymers. A nonlimiting example is to use a *Cladophora* cellulose substrate functionalized with PPy as one electrode and the same substrate material functionalized with polyaniline as the other electrode. Another example is to use a microfibrillated cellulose substrate functionalized with PPy as one electrode and the same substrate functionalized with polyaniline as the other electrode.

One embodiment of the present invention relates to the use of the composite material as electrodes in a battery comprising two composite electrodes, one of which has been electrochemically coated with a layer of metal. Non-limiting examples of metals to be used are silver, copper, tin and antimony.

One embodiment of the present invention relates to the use of the composite material as electrodes in a lithium ion battery. The composite material may be used as one or both electrodes or constitute a part of one or both electrodes. To optimize the composite for cycling of $Li^+$ ions, electropolymerization of an additional layer of PPy may be carried out in the presence of a large immobile anion such as but not limited to p-toluene sulfonate, polystyrene sulfonate and phosphomolybdate. A nonaqueous electrolyte (based on e.g. but not limited to ethyl carbonate and diethyl carbonate and a lithium salts e.g. but not limited to $LiPF_6$ or $LiClO_4$) is used.

One embodiment of the present invention relates to the use of a composite based on polypyrrole dip coated on a high surface area polypropylene substrate. A non limiting example of a use of such a composite is as an electrode for the extraction of anions from solutions.

In all above described battery and energy storage application the composite according to the present invention may be used as one electrode or both electrodes. The composite may also be part of one or both electrodes.

The composite material disclosed herein may contain any material or combination of materials that do not adversely affect the properties of the composite in the application for which it is tailored. The composite may be integrated as part of a system containing additional layers or structures or the composite may constitute the entire active element in an application.

The following Examples demonstrate various aspects of the invention but are intended to be non-limiting of the invention.

EXAMPLE 1

In this example, 200 mg of *Cladophora* sp. algae cellulose powder was dispersed in 50 ml of water using high energy-ultrasonic treatment (VibraCell 750W, Sonics, USA) for 8 minutes and the dispersion was collected on a filter paper. 3 ml of pyrrole was put in a volumetric flask and the total volume was brought to 100 ml. The collected cellulose cake was mixed with pyrrole solution and dispersed using the ultrasonicator for 1 min. The dispersion was allowed to stand for 30 minutes and then collected on filter paper. 8 g of $FeCl_3$ was dissolved in 100 g of water and run through the filter cake to induce polymerization. A porous sponge-like cake was formed. 100 ml of 0.1 M HCl was run through the cake as a dopant. The product was then thoroughly washed with water and dried in paper sheets. A reference cellulose material produced according to the above description, excluding the coating step with Py monomer, has a surface area of 74 m²/g.

Figure 2:
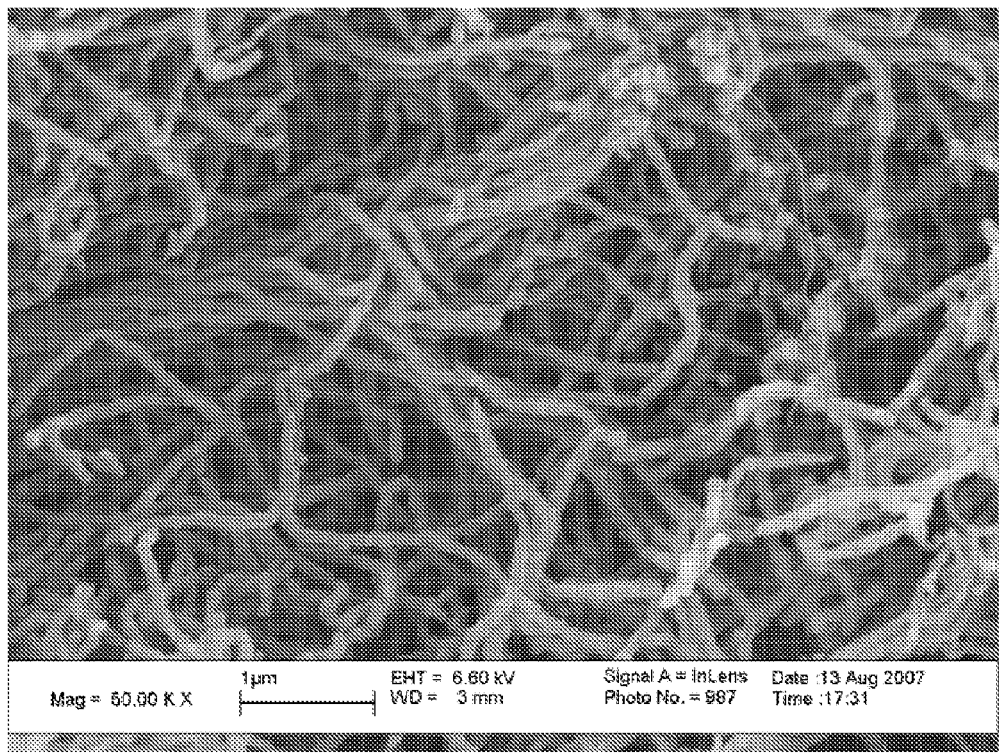
FIG. 2 shows a scanning electron microscopy (SEM) image (micrograph) of a PPy-coated *Cladophora* cellulose composite wherein the fibers are coated by a homogenous and uninterrupted layer of PPy with maintained pore structure and high surface area of the cellulose.
Figure 3:
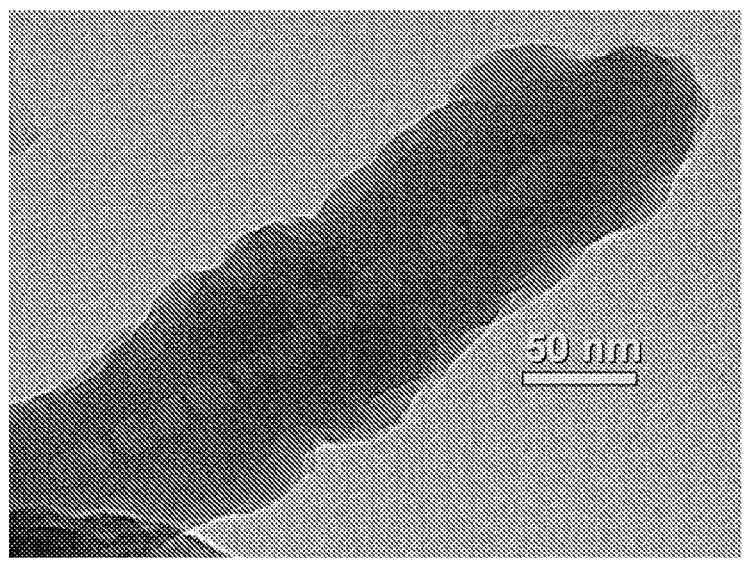
FIG. 3 shows a transmission electron microscopy image of an individual *Cladophora* cellulose fiber (center) coated with a 50 nm thick homogeneous layer of PPy.
Figure 4:
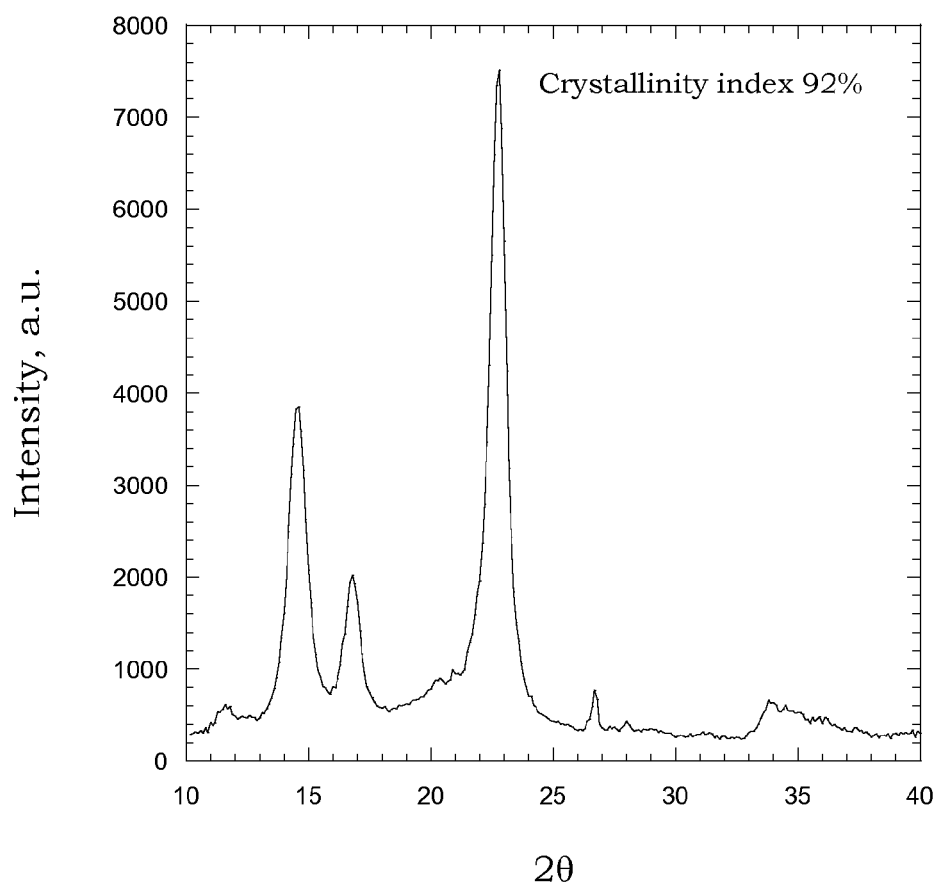
FIG. 4 shows an X-ray diffraction pattern of a *Cladophora* cellulose powder derived from green algae collected from the Baltic Sea wherein the peaks are sharp and well-resolved, indicating high degree of order and two well-resolved peaks are observed at 14 and 17 2θ degrees, unlike ordinary land-plant cellulose powder for which a single broad peak generally is observed between 13 and 18 2θ degrees.

A sheet of the prepared sample is shown in FIG. 1. The material possesses significant mechanical resilience as it can be bent, twisted, or foiled without impairing its intrinsic integrity. Scanning Electron Micrographs were taken with Leo Gemini 1550 FEG SEM, UK. The samples were mounted on aluminum stubs using a double-sided adhesive tape and sputtered with Au—Pt prior to microscopy. A micrograph of the sample is shown in FIG. 2. Fine fibers, 10-20 μm in width, are clearly seen. The fibers are intertwined and form a 3-D pore network. No islands of PPy are seen as previously reported (Johnston et al, *Synthetic Metals,* 153:65-68 (2005)) and the coating on the fiber surface is uninterrupted. The SEM micrograph suggests significant porosity and that the PPy coating did not impair the fine pore network. FIG. 3 depicts the transmission electron microscopy picture of the ICP composite material. The cellulose fiber in the center of the composite coated with a continuous and uninterrupted layer of PPy is clearly seen. It appears from this picture that the thickness of the PPy coating is around 50 nm. FIG. 4 shows the XRD profile of the substrate cellulose material. Narrow and well-defined peaks suggest a high degree of structural organization and the crystallinity index is estimated to be 92%.

Figure 5A:
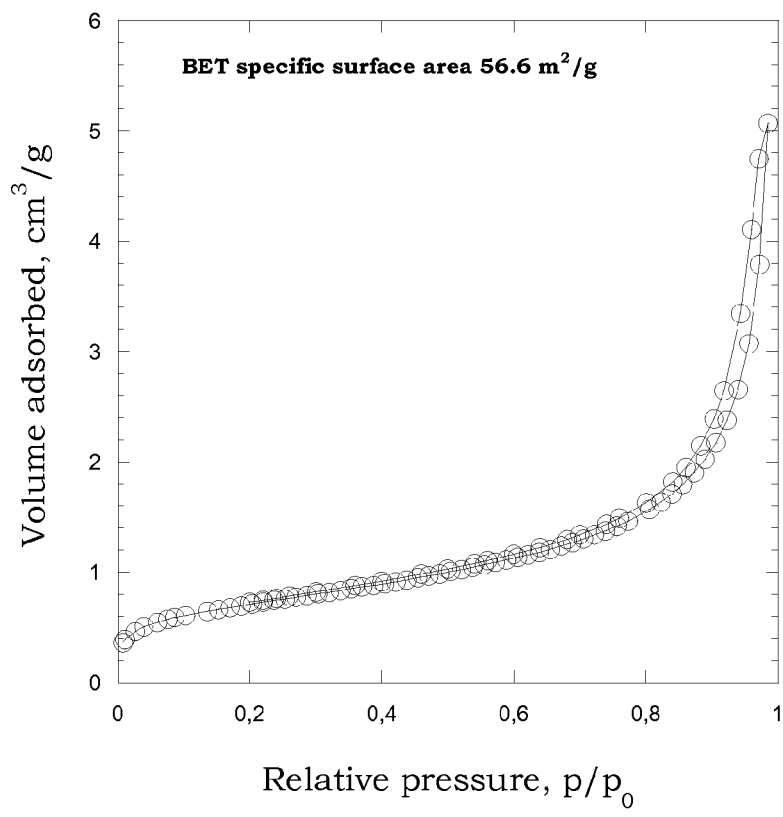
FIGS. 5A and 5B show the $N_2$ gas absorption isotherm and BJH pore size distribution, respectively, of a PPy/*Cladophora* cellulose composite, wherein the size of the majority of the pores is seen to be between 10 and 100 nm.
Figure 5B:
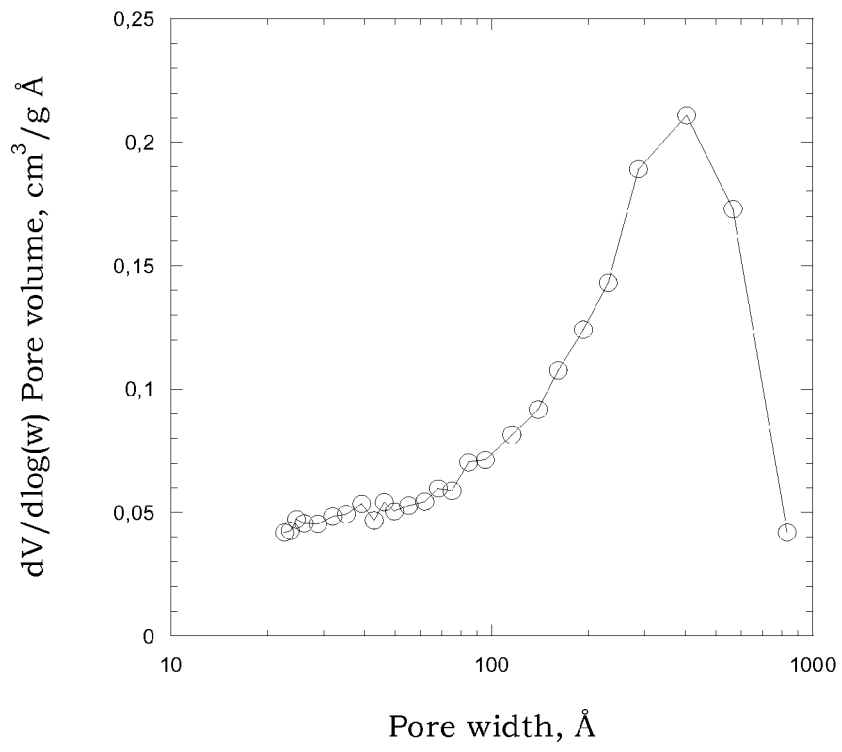
Figure 6A:
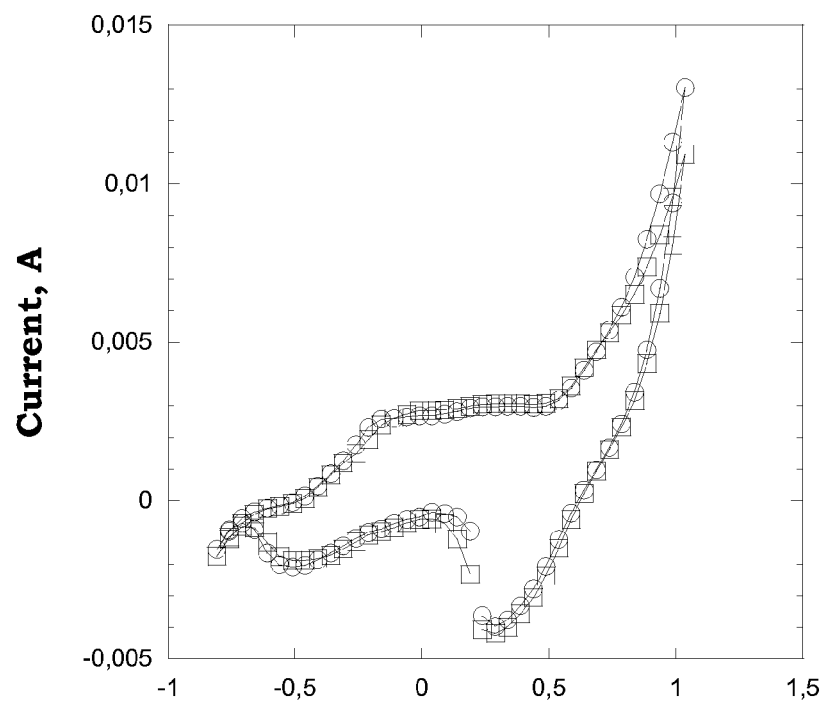
FIGS. 6A-6D show cyclic voltammograms obtained at a scan rate of (6A) 0.5 mV/s, (6B) 1 mV/s, (6C) 2.5 mV/s, and (6D) 5 mV/s, in saturated NaCl solutions at room temperature with a PPy/*Cladophora* cellulose composite obtained by polymerizing pyrrole in the presence of chloride ions used as the working electrode. The voltammograms show that chloride ions are moving in (during oxidation) and out (during reduction) of the composite when the potential of the composite is changed. The sizes of the composite pieces used in these particular measurements were 7 mm×4 mm×1 mm, 8 mm×4 mm×1 mm, 9 mm×5 mm×1 mm, and 8 mm×5 mm×1 mm, respectively. A three-electrode set-up with a platinum counter electrode and an Ag/AgCl reference electrode was used. The potential is given vs. the Ag/AgCl reference electrode.
Figure 6B:
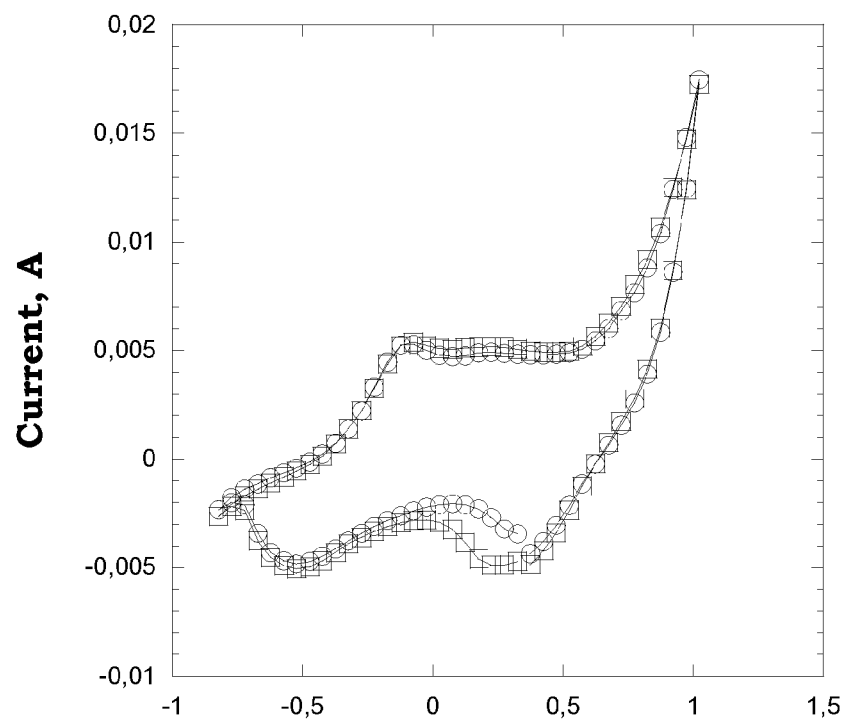
Figure 6C:
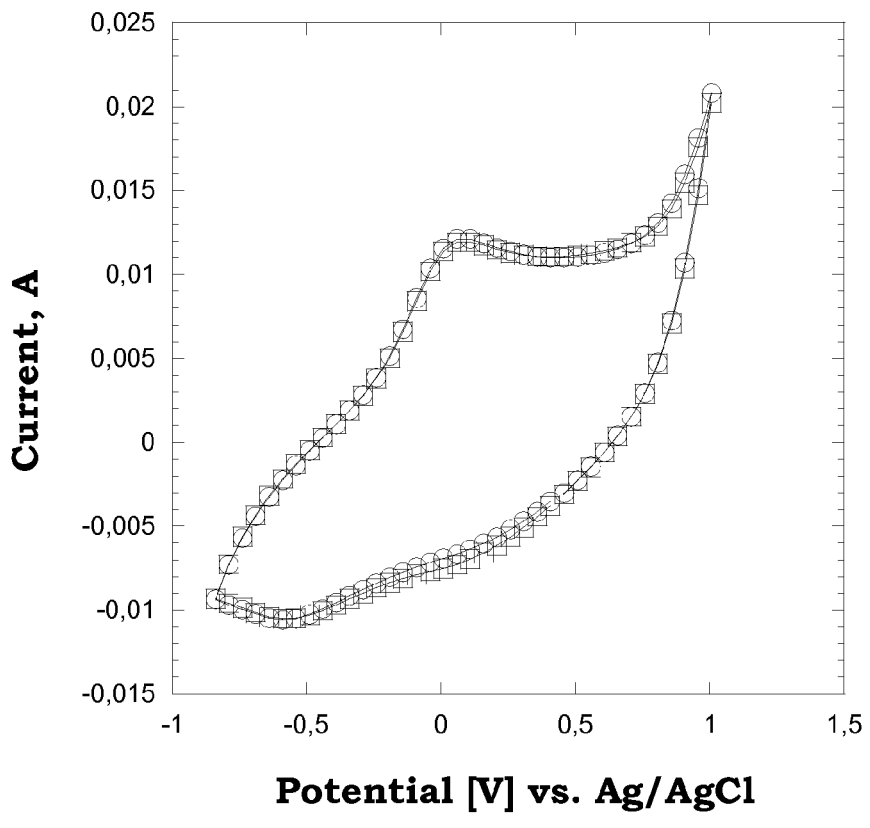
Figure 6D:
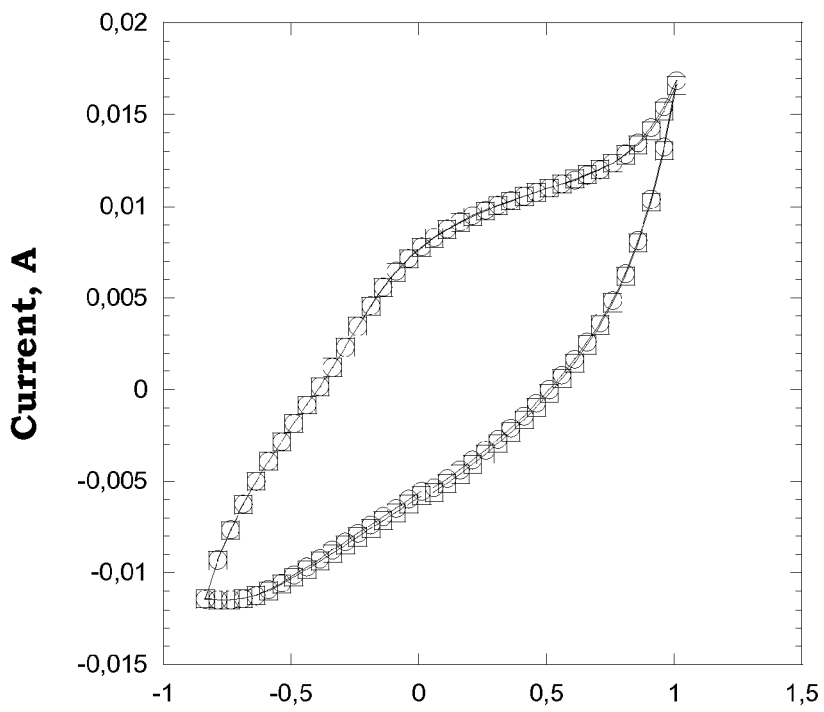

Nitrogen gas adsorption and desorption isotherms were obtained with ASAP 2020, Micromertitics, USA. The specific surface area was measured according to the BET method and the porosity of the sample was evaluated using the BJH method. The adsorption isotherm, shown in FIG. 5A, is a typical Type II curve. The measured specific surface area was 56.56 m²/g and the total pore volume was 0.1757 cm³/g (single point adsorption volume of pores less than 1372.8 Å with $p/p_0$=0.9857). A reference cellulose material produced according to the above description, excluding the coating step with Py monomer, has a surface area of 74 m²/g. In FIG. 5B, the BJH desorption data are also plotted as the derivative of pore volume against the pore size. It appears from the plot that most of the pores are in the range between 200 and 600 Å. The results of the gas adsorption analysis are in compliance with SEM pictures showing that the large surface area and pore volume were not impaired following polymerization of pyrrole on cellulose fibers.

In ion incorporation experiments, it was shown that a large surface area of the PPy film is crucial for the functionality and particularly for obtaining high ion sorption capacity of the film. Whereas smaller ions may exhibit enough mobility to penetrate into the polymer bulk, sorption of large ionized species is confined to the outermost layer of the polymer adjacent to the liquid interface. Thus, having thick polymer films to increase the sorption capacity is often unjustified. This is especially true for large ions which are capable of entering only short distances into the bulk of the polymer film. Therefore, relatively thin polymer films distributed over a large surface area as in the present composite materials are preferable to improve the efficiency and specific sorption capacity.

Cyclic voltammetry experiments were performed using the PPy-*Cladophora* composite material as a working electrode in a three electrode set-up with a platinum counter electrode and an Ag/AgCl reference electrode. The experiments employed a range of ion containing solutions at various concentrations. The experiments using a saturated NaCl solution as electrolyte and carried out at different voltage sweep rates are shown in FIGS. 6A-6D. The oxidation and reduction peaks are clearly seen in the plots though they are more clearly expressed at a slower sweep rate. In order to obtain cyclic voltammograms, saturated NaCl was used and the size of the specimen was miniaturized. Otherwise, the current would be controlled by the resistance of the electrolyte solution. The latter indicates that the amount of polymer in the composite is large and that the conductivity of the specimen is high.

Figure 7:
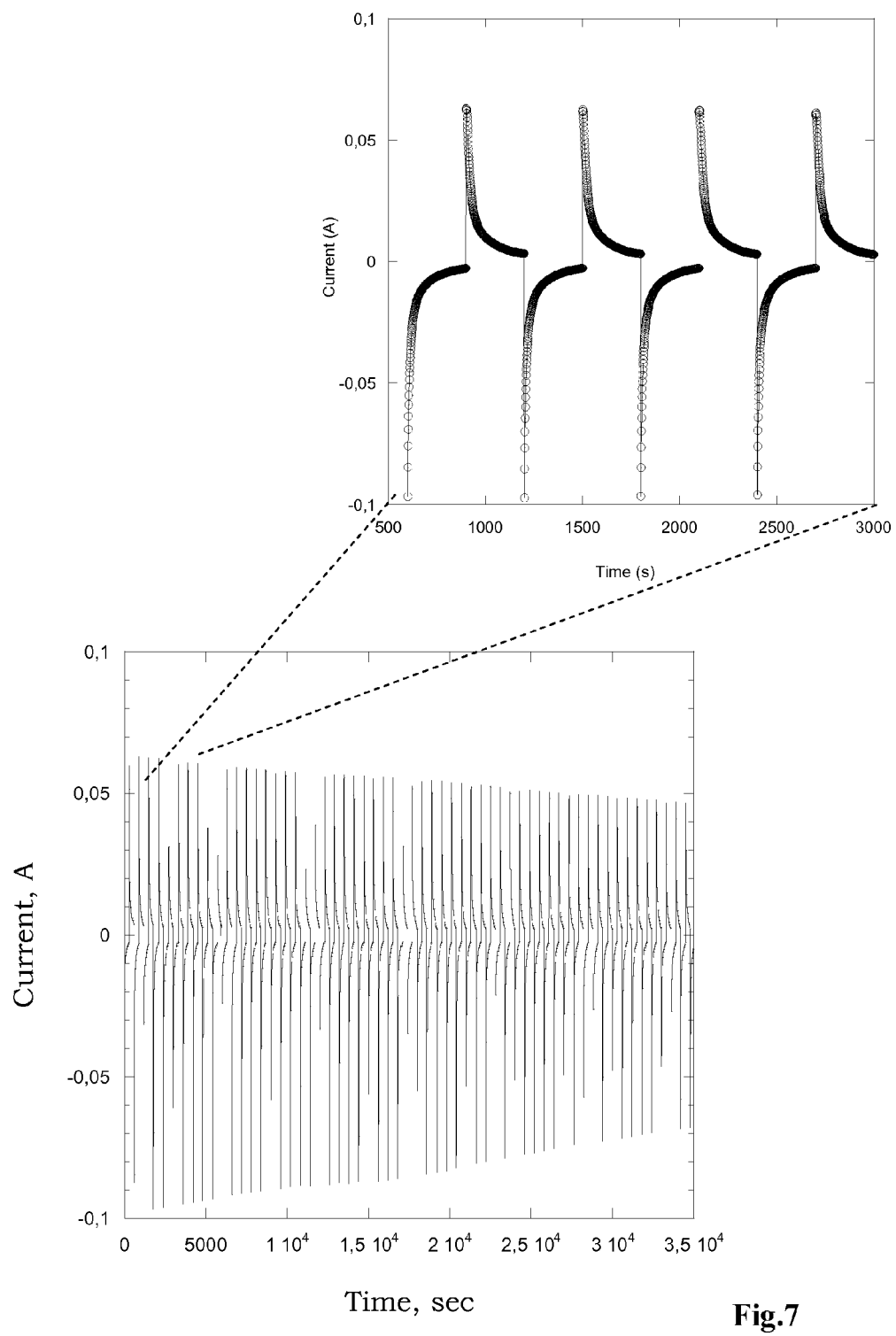
FIG. 7 shows the chronoamperometric (potential step) responses of a PPy/*Cladophora* cellulose composite during a 60 double step experiment. The potential was stepped between −0.5 V and +0.7 V and the potential was kept constant for 300 seconds after each step.

In order to test the functionality of the composite material over a number of oxidation and reduction cycles (n=60), chronamperometry experiments were performed in an electrochemical cell set-up identical to that used in the cyclic voltammetry experiments. The results are summarized in FIG. 7. First the material was reduced by applying a potential of −0.5 V, which results in desorption of Cl⁻ ions from the polymer film. Then a potential of +0.7 V was applied to oxidize the film. During this stage Cl⁻ ions are driven back into the film to maintain electroneutrality within the film. It is clear from the plot that the film largely maintains its ability to absorb and resorb ions over a period of 60 cycles corresponding to almost 10 hours. This experiment and similar experiments performed in other salt solutions indicate that the PPy-*Cladophora* cellulose composite materials can be repeatedly used. This is an important feature for industrial applicability.

EXAMPLE 2

Figure 8:
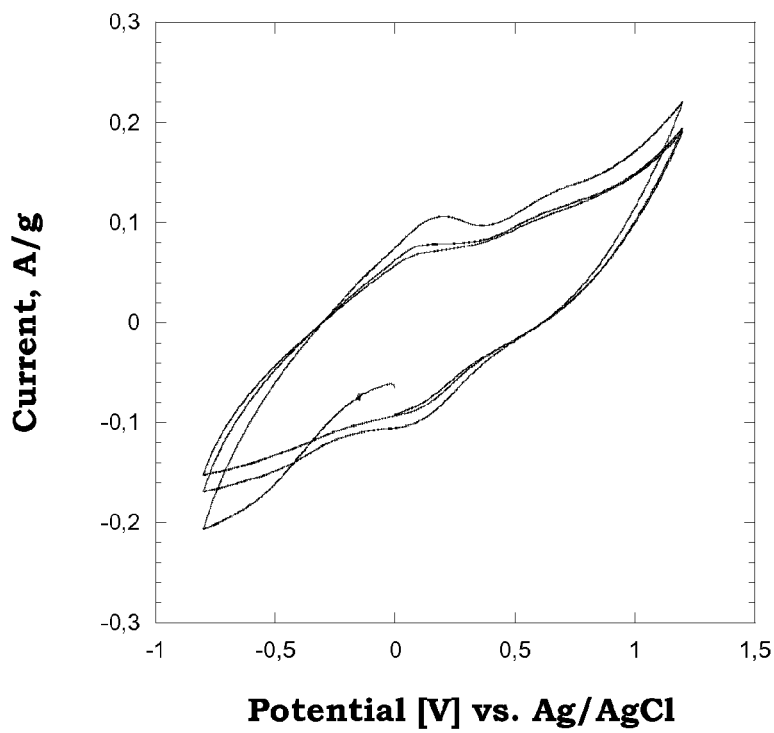
FIG. 8 shows cyclic voltammograms obtained at a scan rate of 5 mV/s in a solution containing 2 M sodium p-toluene sulfonate (a large size model anion) at room temperature with a PPy/*Cladophora* cellulose composite polymerized in the presence of phosphomolybdate anions. The voltammograms demonstrate that large anions (with sizes comparable to that of a typical amino acid) can be reversibly absorbed and expelled from the composite material. The macroscopic size of the composite used in this particular measurement was 10 mm×4 mm×1 mm. A three-electrode set-up with a platinum counter electrode and an Ag/AgCl reference electrode was used. The displayed potential is given vs. the Ag/AgCl reference electrode.

A PPy/*Cladophora* cellulose composite material was produced according to the general description of Example 1 except that phosphomolybdic acid was employed as the oxidant during the polymerisation instead of the iron (III) chloride used in Example 1. The same recipe as described in Example 1 was used to prepare the material, but instead of 8 g of iron (III) chloride, 34 g of phosphomolybdate was used. This was done in order to create larger voids in the composite after electrochemical reduction to allow larger anions to be absorbed by the film upon oxidation in an ion containing liquid. FIG. 8 shows cyclic voltammograms obtained with the PPy/*Cladophora* cellulose composite doped with phosphomolybdate at a scan rate of 5 mV/s, in a 2.0 M sodium p-toluene sulfonate solution (a model large size anion) at room temperature. The voltammograms demonstrate that large anions (with a size comparable to that of a typical amino acid) can be reversibly absorbed and expelled from the composite material. The macroscopic size of the composite used in this particular measurement was 10 mm×4 mm×1 mm. A three-electrode set-up with a platinum counter electrode and an Ag/AgCl reference electrode was used. The displayed potential is given vs. the Ag/AgCl reference electrode.

EXAMPLE 3

Figure 9:
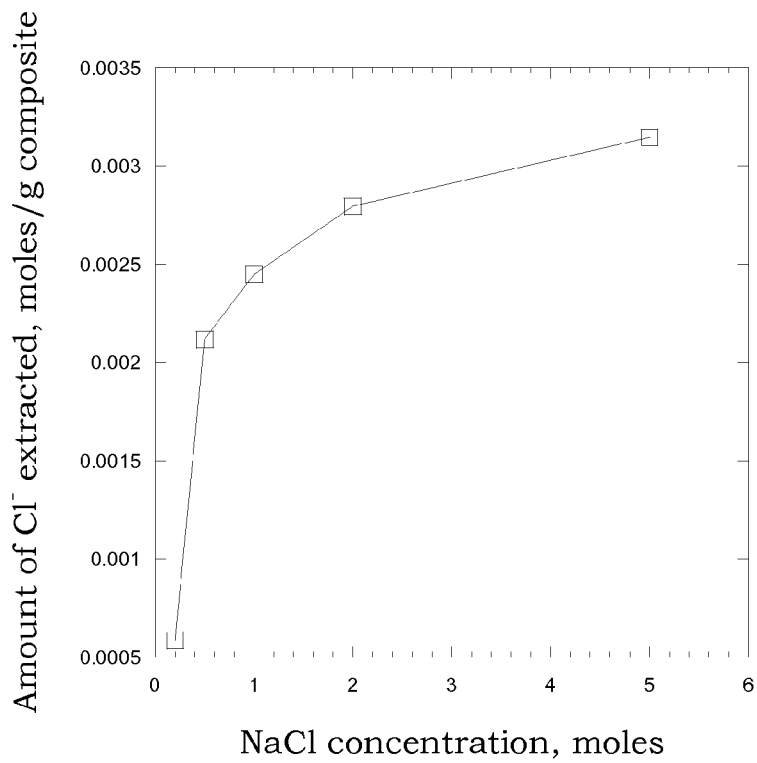
FIG. 9 shows the amount of chloride ions absorbed into a PPy/*Cladophora* cellulose composite per gram material as a function of the NaCl concentration in the solution for a potential step experiment in which the potential was stepped between −0.8 V and +0.7 V, and the potential was kept at each potential for 300 seconds. The data shown are average values for the first 5 reduction (−0.8 V) and oxidation (+0.7 V) steps. The measurements were performed at room-temperature. A three-electrode set-up with a platinum counter electrode and an Ag/AgCl reference electrode was used.

A high-capacity cellulose-based ICP composite material produced as in Example 1 is used to extract anions, viz. chloride or p-toluene sulfonate from solution. The ICP is acting as a working electrode, whereas a platinum wire is used as the counter electrode and Ag/AgCl is used as the reference. A sheet of ICP composite material of about 1 g is foiled and appropriately contacted. Prior to separation, the film is reduced by applying a negative potential of −0.8 V for 15 min. The high-capacity ICP composite is dipped into a beaker containing 250 ml of solution from which the ions are to be extracted. Upon dipping into a solution, a potential of +0.7 V is applied for 15 min. Then, the three electrode set-up is removed from the beaker containing the sample solution and is dipped into a 1.0 M sodium chloride solution. A potential of −0.8 V is then applied for 15 minutes to release the absorbed ions. Upon completion of this reduction step, the three-electrode setup is re-immersed into the sample solution and re-used. FIG. 9 shows the amount of the chloride ions absorbed as the function of the sodium chloride concentration in the electrolyte solution. The amount of chloride ions absorbed is higher at higher concentrations of the electrolyte.

A similar set of experiments was performed to extract p-toluene sulfonate ions (relatively large organic anions) from solution by using the ICP composite material produced by polymerization of pyrrole with iron (III) chloride as described above. The efficiency of the extraction was independently verified by a chemical element analysis (sulfur content) before and after extraction by applying a positive potential of 0.9V for 300 seconds. Further, the efficiency of the release was further verified by an independent chemical element analysis (sulfur content) following electrochemically controlled desorption by applying a potential of −0.8V for 300 seconds. The results, as summarized in Table 2, indicate that the reference sample, which never was in contact with sodium salt of p-toluene sulfonic acid, is void of sulfur element. The sample that was oxidized in the presence of the p-toluene sulfonate ions contains significant amounts of sulfur element (as high as 6.1% wt composite). Upon desorption of the p-toluene sulfonate ions from the ICP composite material by electrochemical reduction, the sulfur content of the sample is reduced to about 1.6% wt composite.

TABLE 2

Chemical element analysis of p-toluene sulfonate in ICP composite following electrochemical extraction and desorption.

| Sample | Sulfur content, % wt |
| --- | --- |
| Reference | <0.05 |
| Oxidized in p-toluene sulfonate | 6.1 |
| Reduced in p-toluene sulfonate | 1.6 |

EXAMPLE 4

An ICP composite material of microfibrillated cellulose is used as an electrode material for extraction of anionic substances. The microfibrillated cellulose is obtained from beaten pulp of long native cellulose fibers. The cellulose fibers in pulp mass were activated and dispersed by using a high-pressure homogenizer to obtain an opaque dispersion of high moisture content (85% wt). To 50 ml of the produced dispersion, 3 ml of Py monomer diluted in 20 ml of water is added and thoroughly mixed. The mixture is then collected on a paper filter. 8 g of iron (III) chloride is dissolved in 100 ml of water and then run through the dispersed mass collected on filter to induce polymerization. The residual mass is then thoroughly washed and dried at room temperature to obtain a porous paper-like sheet. The BET surface area of the produced sheet was 15 $m^2/g$. A reference cellulose material produced according to the above description, excluding the coating step with Py monomer, has a surface area of 19 $m^2/g$. The composite material is useful for batch-wise extraction of anionic substances.

EXAMPLE 5

A high-capacity cellulose-based ICP composite material as produced in Example 1 is used to extract p-toluene sulfonate from a flowing solution. The ICP is acting as a working electrode, whereas a platinum wire is used as a counter electrode and Ag/AgCl is used as a reference. A sheet of ICP composite of about 1 g is foiled and appropriately contacted and positioned in the flowing solution. Prior to separation, the film is reduced by applying a potential of −0.8 V for 15 minutes in a flowing phosphate buffer solution (PBS). A 1.0 M sodium p-toluene sulfonate solution is then made to flow past the ICP working electrode at a flow rate of 0.1 ml/s. A potential of +0.7 V is applied for 5 min. Subsequently, fresh PBS solution is flowed past the ICP electrode material at a flow rate of 0.05 ml/s. A potential of −0.8 V is applied for 10 min to release p-toluene sulfonate into the PBS solution. Following the desorption of p-toluene sulfonate in PBS, a new portion of starting solution of p-toluene sulfonate is flowed past the ICP electrode to re-absorb anions. Thus, the ICP electrode is repeatedly used to extract and desorb p-toluene sulfonate into PBS. After 33 cycles of repeated extraction and release, the concentration of p-toluene sulfonate in the PBS solution was 0.1 mmol/ml. The use of the described flow system significantly facilitates the extraction procedure and can in principle be used to extract valuable anionic organic substances.

EXAMPLE 6

A high-capacity cellulose-based ICP composite material is produced as in Example 1. The composite is then used as working electrode by dipping it into a 100 ml of a solution containing 0.1M Py monomer and 0.1 M polystyrene sulfonate (Mw 70000, Aldrich). An Ag/AgCl electrode was used as the reference and a Pt wire was used as the counter electrode. The potential varied between −1.0 and +1.0 V during ten scans using a scan rate of 10 mV/s to induce electropolymerization of PPy and immobiliziation of polystyrene sulfonate in the resulting PPy matrix. As a result, a cation exchange membrane was obtained which was used to extract $Na^+$, $K^+$, $Ca^{2+}$, $Me^{2+}$, and $Ba^{2+}$ from aqueous samples. The thickness of the PPy film was found to increase with the number of cycles used during the electropolymerization and was ~80 nm as verified with TEM. The surface area of the composite doped with polystyrene sulfonate was smaller that that of a reference cellulose material (48 $m^2/g$ vs. 74 $m^2/g$, respectively).

EXAMPLE 7

An array of two electrodes was built by combining an anion-exchange ICP electrode as described in Example 1 with a cation-exchange ICP electrode described in Example 6. 0.5 g of ICP electrodes are appropriately connected as the working electrodes for electrochemical ion exchange. The anion and cation exchanging composites are in this case placed in series in the flowing solution and each composite working electrode is associated with a counter and reference electrode to enable individual potentiostatic control of the charges of the composites. The set-up is then used to reduce the salt content from a 0.4 M sodium chloride solution having an initial conductivity of 40 mS/cm. An Ag/AgCl electrode is used as the reference and Pt wire is used as the counter electrode in combination with each ICP electrode. By successful simultaneous application of a potential of −0.8 V for 10 min, followed by a potential of +0.7 V for 10 min to the anion exchanging ICP electrode, and a potential of +0.7 V for 10 min, followed by a potential of −0.8 V for 10 min to the cation exchanging ICP electrode, the conductivity of the salt solution is reduced by 50% after 15 cycles.

EXAMPLE 8

A high-capacity cellulose-based ICP composite material, produced with phosphomolybdic acid as the oxidizing agent as in Example 2 is used as an electrochemically controlled solid phase device for batch wise extraction wherein the composite is dipped directly into a solution to extract an anionic oligopeptide composed of 4 glutamic acid residues (0.5 M solution in PBS). The ICP is acting as a working electrode, whereas a platinum wire is used as the counter electrode and an Ag/AgCl electrode is used as the reference electrode. A sheet of ICP composite material of about 1 g is foiled and appropriately contacted. Prior to separation, the material is reduced by applying a potential of −0.8 V for 15 min. The high-capacity ICP composite material is then dipped into a beaker containing 250 ml of solution from which the oligopeptide is to be extracted. Upon dipping into a solution, a potential of +0.7 V is applied for 15 min. Then, the three-electrode set-up is removed from the beaker containing the PBS medium and is dipped into a 1.0 M sodium chloride solution. A potential of −0.8 V is applied for 15 minutes to release the absorbed oligopeptide. Upon completion of this reduction step, the three-electrode setup is re-immersed into the PBS solution and re-used. The working electrode was thus repeatedly used to extract and transfer the oligopeptide from one medium to another. After 15 cycles, the concentration of oligopeptide in the sodium chloride solution was 0.02 mmol/ml. This particular experiment is designed to demonstrate the possibilities for batch-wise extraction of a number of negatively charged amino acids (including enantiomers) and proteins.

EXAMPLE 9

In the following setup, a high-capacity cellulose-based ICP composite material, prepared in the presence of a large anion as described in Example 6, is used for batch-wise extraction wherein the composite is dipped directly into a solution to extract a cationic peptide from a bacterial medium. The ICP is acting as a working electrode, whereas a platinum wire is used as a counter electrode and an Ag/AgCl electrode is used as the reference electrode. A sheet of ICP composite material of about 1 g is foiled and appropriately contacted. Prior to separation, the film is oxidized by applying a potential of +0.7 V for 15 min. The high-capacity ICP composite is dipped into a beaker containing 250 ml of solution from which the peptide is to be extracted. Upon dipping into a solution, a potential of −0.8 V is applied for 15 min. Then, the three-electrode set-up is removed from the beaker containing the bacterial medium and is dipped into a 1.0 M sodium chloride solution. A potential of +0.7 V is applied for 15 minutes to release the absorbed peptide. Upon completion of this oxidation step, the three-electrode setup is re-immersed into the bacterial medium and re-used. The working electrode thus is repeatedly used to extract the peptide. This particular experiment is designed for batch-wise extraction of a number of positively charged amino acids, including enantiomers, and proteins.

EXAMPLE 10

A high-capacity cellulose-based ICP composite material, prepared as described in Example 1 or Example 6, respectively, is used for the extraction of anions (or cations) from waste water based on the procedures described in Example 3 (or 6). The anion (or cation) exchanging composite material is inserted into the waste water and a potential of −0.8 (or +0.7) V is applied during 15 minutes prior to the extraction step during which a potential of +0.7 (or −0.8) V is applied for 15 minutes. After the extraction, the extracted ions can either be released into a solution containing 1.0 M NaCl by reducing (or oxidizing) the composite at a potential of −0.8 (or +0.7) V during 15 minutes, or the composite can merely be discarded and burned in an incinerator. New extractions are then made with new analogous composites. This particular experiment is designed to demonstrate that the present composite material can be used for inexpensive single shot removal of ions from very complex solutions such as waste water.

EXAMPLE 11

Two high-capacity cellulose-based ICP composite materials doped with a mobile anion and a large immobile anion (as described in Example 10), respectively, are used for the extraction of both anions and cations from waste water-based on the procedure described in Example 10. The anion and cation exchanging composite materials are in this case placed in series in the flowing solution (as described in Example 7) and each composite working electrode is associated with a counter and reference electrode to enable individual control of the charge of the composites. The device was used to simultaneously remove polluting anions and cations from waste-water. In analogy with Example 10, the composites were discarded after the completion of the extraction procedure.

EXAMPLE 12

Figure 10:
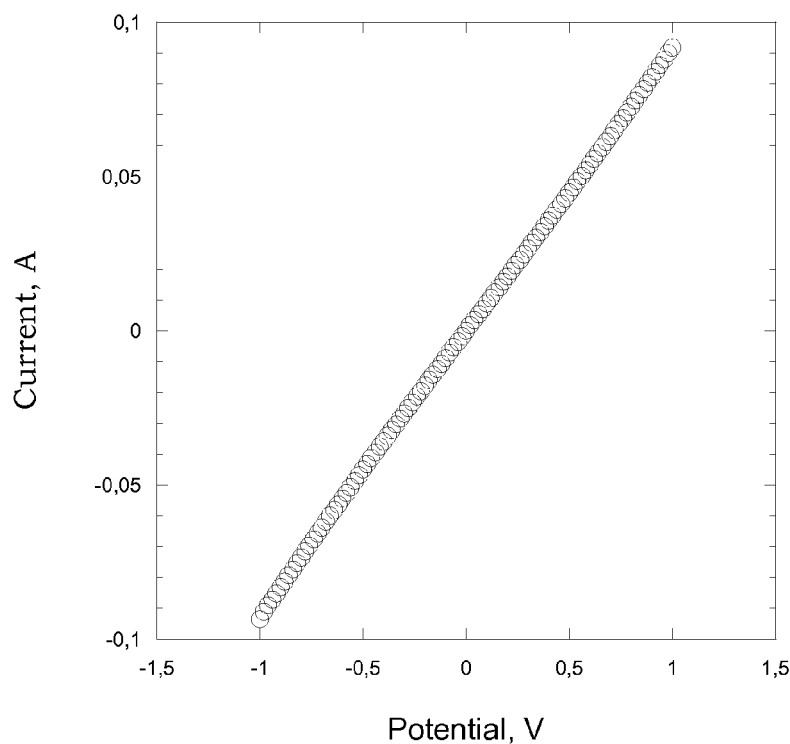
FIG. 10 shows a typical current-voltage (IV) sweep curve of a dry PPy/*Cladophora* cellulose composite sample. The obtained curve is linear throughout the measurement range indicating Ohmic behavior. The specimen size was 30 mm×17 mm×1 mm.
Figure 11:
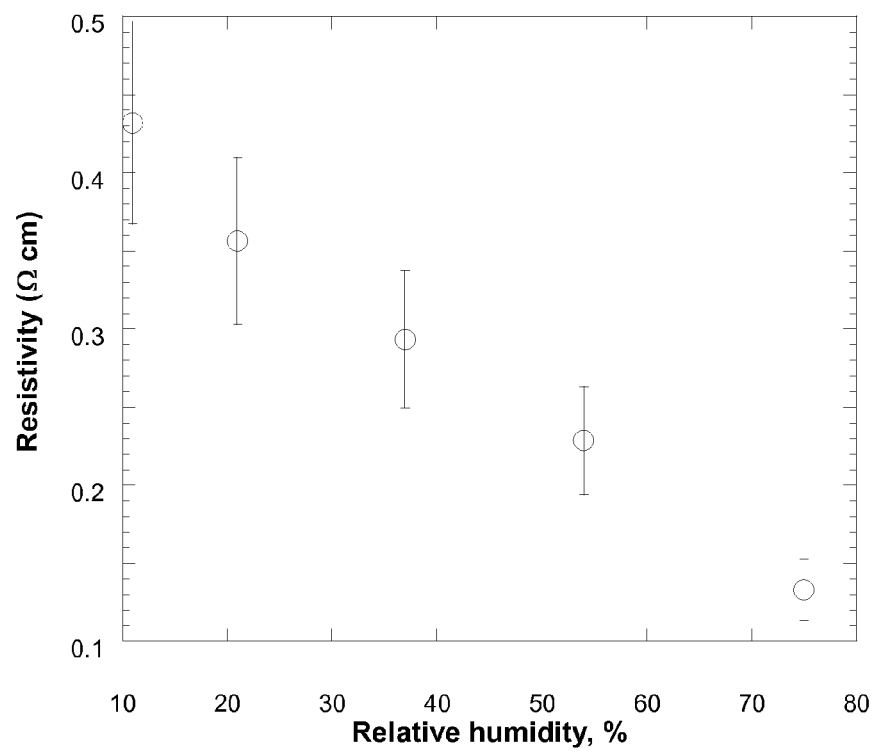
FIG. 11 shows the change in the resistivity of a PPy/*Cladophora* cellulose composite as a function of the surrounding relative humidity. The resistivity of the film decreases as the relative humidity is increased. The specimen size was 30 mm×17 mm×1 mm.

This example demonstrates the use of a high surface area ICP composite material as a moisture sensor. A narrow strip of the composite material described in Example 1 is employed. The typical dimensions of the strip are 2 cm in length, 0.5 cm in width, and 0.1 cm in thickness. The strip is fixed between two metal electrodes and glued with a silver glue to ensure intimate contact. A current is run through the strip and the resistance is continuously monitored. When exposed to an environment with varying relative humidity, the resistance of the strip changes accordingly and is recorded. The resistance of the sample is measured using a semiconductor device analyzer (B1500A, Agilent Technologies, USA). The results are summarized in FIG. 10. The PPy/cellulose samples are dried in a dessicator over $P_2O_5$ over a period of 10 days prior to the analysis. The samples are then transferred to another dessicator with controlled relative humidity and stored for at least 4 days. The relative humidity is controlled by using saturated salt solutions of LiCl, $K_2CO_3$, NaI and NaCl which resulted in relative humidities of 11, 37, 54, and 75%, respectively. FIG. 10 shows a typical IV sweep curve for a dry composite sample showing that the resistances of dry samples can be obtained based on Ohm's law. Whereas the resistance of a piece of *Cladophora* cellulose sheet of similar dimensions is in the order of MOhm, it is clear from this plot that as a result of polymerization of pyrrole on cellulose fibers, the conductivity of the *Cladophora* cellulose has been improved almost $10^6$ times. In FIG. 11, the resistance of PPy/cellulose composite as a function of the relative humidity (RH) is presented. It can be concluded from the plot that the resistance of PPy/cellulose composites decreases as the RH is increased, showing a property which may be useful in moisture sensor applications.

EXAMPLE 13

A high-capacity cellulose-based ICP composite material doped either with a mobile anion or a large immobile anion (as described in Examples 1, 2, 6 and 10) is used as a stationary phase material in electrochemically controlled ion exchange chromatography for the separation of anions, cations and polar compounds in a flowing solution. The ICP is acting as a working electrode, whereas a platinum wire is used as a counter electrode and Ag/AgCl is used as a reference. The ICP composite material is appropriately contacted and positioned in the flowing solution. During the separation, the potential of the ICP is controlled by applying either a constant potential, potential pulses or another type of potential program so as to control the charge of the polymer. This enables a separation of species in the flowing solution based on their different interactions with the composite material. The set-up was successfully used for the separation of a set of amino acids and peptides.

EXAMPLE 14

An ICP composite material doped with either a mobile anion or a large immobile anion (as described in Examples 1, 2, 6 and 10) is used for redox controlled drug delivery of anionic and cationic drugs, respectively. The latter drugs are first absorbed within the composite during the oxidation or reduction of the composite in a solution containing the drugs. The drugs are then released from the composite at open circuit conditions as a result of a slow reduction or oxidation of the composite material due to the presence of an oxidizing or reducing agent in the solution in contact with the composite material, or a change in the redox potential of the solution in contact with the composite material. The release can also be accomplished using a controlled potential or current set-up in which the composite material acts as the working electrode. The approach was successfully used for redox controlled delivery of amino acids and peptides into solutions of phosphate buffers (PBS) by controlling the redox potential of the solution by introduction of different concentrations of Fe(II) and Fe(III) into the solution.

EXAMPLE 15

Figure 12:
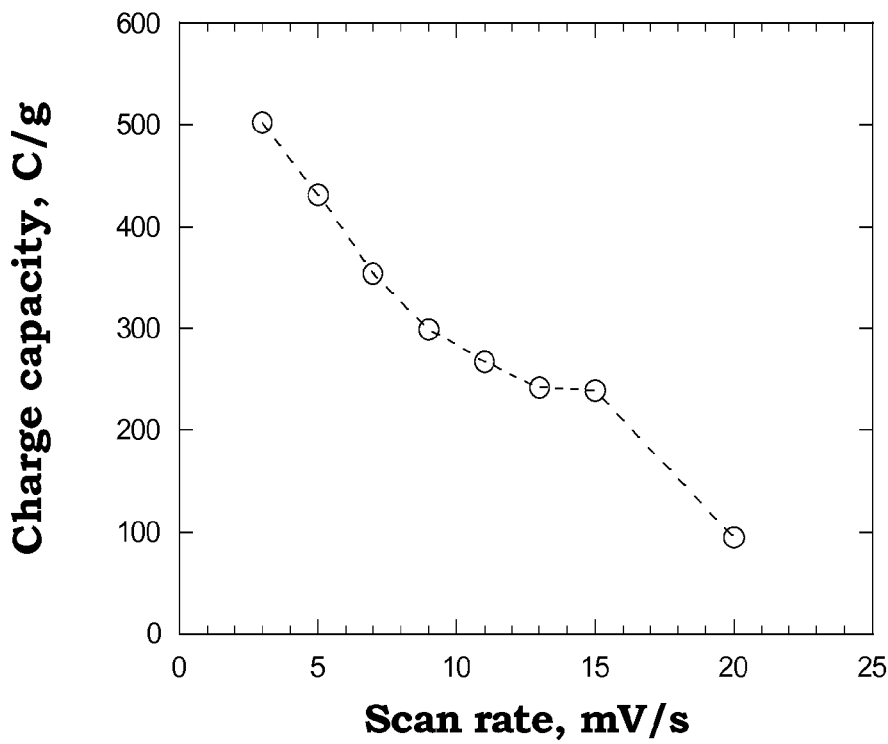
FIG. 12 shows the charge capacity of a PPy/*Cladophora* cellulose composite (obtained from the cyclic voltammogram) vs. the scan rate. A three-electrode set-up with a platinum counter electrode and an Ag/AgCl reference electrode was used. A 2.0 M NaCl electrolyte was employed. The charge capacity decreases as the scan rate is increased as is common for conducting polymer-based materials.
Figure 13:
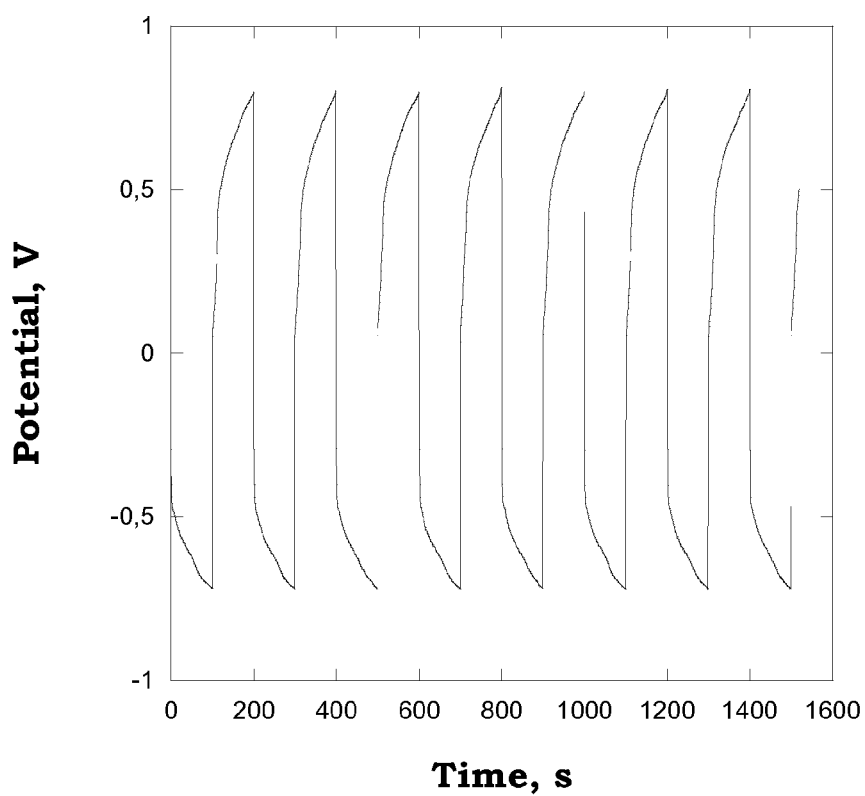
FIG. 13 shows the galvanostatic charge and discharge profile for the PPy/*Cladophora* cellulose composite in 2.0 M solution of sodium chloride. A two-electrode setup comprising two identical PPy/*Cladophora* cellulose composite electrodes was used. The time scale, which is arbitrary, serves to illustrate the responses after the attainment of steady state.
Figure 14:
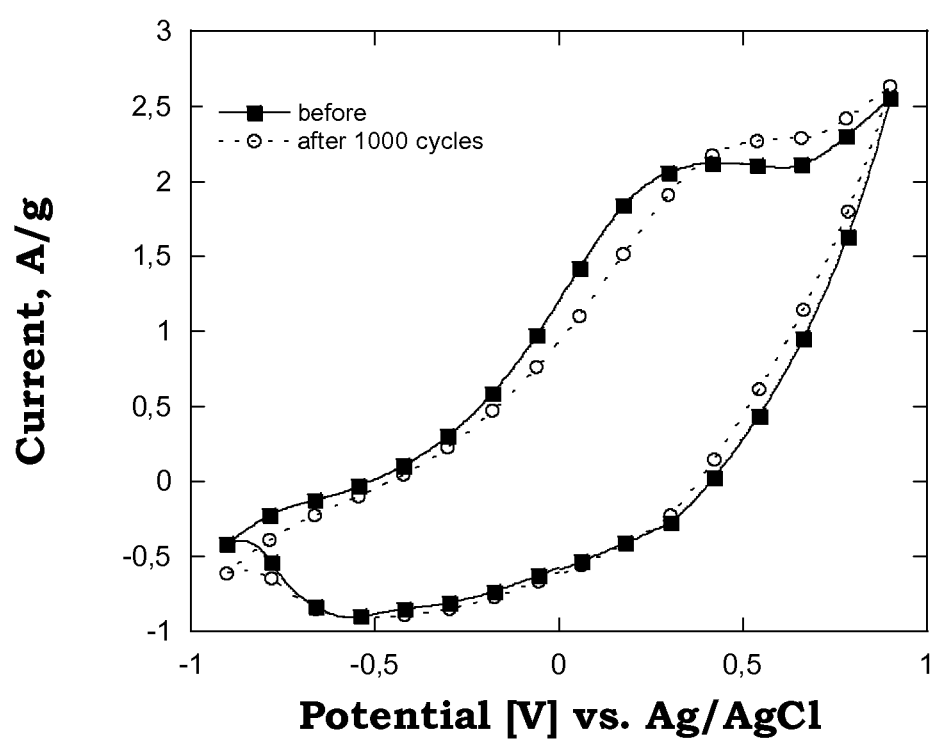
FIG. 14 shows cyclic voltammograms of PPy/*Cladophora* cellulose composite electrodes before and after 1000 cycles of the charge-discharge experiments. A three-electrode set-up with a platinum counter electrode and an Ag/AgCl reference electrode was used. A 2.0 M NaCl electrolyte was employed. The plot demonstrates that the electroactive properties of the PPy/*Cladophora* cellulose composite remained virtually unchanged after 1000 cycles, after which the experiment was stopped.

An ICP composite as described in Example 1 is used as an electrode in a battery. Two identical pieces of the ICP composite material were immersed in a beaker containing 2.0 M sodium chloride. FIG. 12 shows the charge capacity of the composite ICP electrode as a function of the scan rate as obtained from cyclic voltammetry results. As seen from FIGS. 6A-6D, the cyclic voltammograms do not have a rectangular shape which is typical for double layer capacitors. Instead, peaks during anodic and cathodic scans are observed which clearly indicate a pseudo-capacitive behavior. Previously ICP electrodes with rectangular cyclic voltammograms have been reported. The latter is not surprising as these electrodes have a very thick layer of ICP (typically several hundreds of microns), which explains the ideal double-layer capacitive behavior. The response of the ICP composite disclosed herein is different from that of the materials described previously, as the electrical charge is stored primarily as a result of Faradaic processes due to the thin (only 50 nm) coating distributed over a large microscopic surface area. As seen from FIG. 12, charge capacities of about 500 C/g were observed corresponding to specific charge capacity of 139 mAh/g, respectively. The obtained specific charge capacity pertains to the ICP composite total weight, whereas most charge capacity values in the literature are calculated per weight of the functional coating only (which is a small fraction of the entire weight). Compared to literature values, the capacity compared to the total electrode weight is thus markedly larger for the composites disclosed herein. As mentioned above, an electrochemical cell can be obtained by simply contacting two identical pieces of ICP composite paper immersed in a solution of suitable electrolyte. The potential difference between the electrodes is obtained due to the differences in the redox states of each of the electrodes responsible for the charge transfer. FIG. 13 shows a galvanostatic charge-discharge experiment for such a simple two-electrode system obtained at a constant applied current of 1 mA for 100 s charge-discharge intervals. Following the initial sharp change at the onset (attributed to the iR drop), the charge-discharge curve is linear. A capacitance of 120 F/g was calculated for this particular experimental setup by excluding the contribution from the iR drop. Long-life time is a prerequisite for successful use of batteries and supercapacitors. FIG. 14 shows the cyclic voltammetry results before and after long-term charge-discharge experiments, in which the charge-discharge cycle was repeated for 1000 times corresponding to 28 hours of non-stop use. As seen from this plot, the electroactivity of the electrode material remained virtually unchanged despite continuous use for 1000 cycles after which the experiment was stopped. The open circuit voltage (OCV) of the system was measured by immersing two composite ICP electrodes of 10 mg in weight in 2.0 M sodium chloride solution. The anode was in the oxidized state (as produced by applying a potential of +1.0 V for 300 s) and the cathode was in the reduced state (as produced by applying a potential of −1 V for 300 s). The OCV in the above experiment was found to be 0.79V.

EXAMPLE 16

An ICP composite material as in Example 4 is useful in energy storage devices. Stacks of pairs of ICP composite electrodes, separated by an electrolyte, provide an energy storage device. In this embodiment, stacks of pairs of ICP composite electrodes, separated by a polyvinyl alcohol gel containing 2.0 M sodium chloride between the electrodes as the electrolyte, were produced. The open circuit output voltage and the energy output was adjusted by the number of pairs and surface area of the ICP electrodes used. For a stack composed of ten pairs of composite electrodes, the open circuit output voltage was found to be 6.5 V.

EXAMPLE 17

Two ICP composite materials with different redox potentials, one based on polypyrrole as the conducting polymer and one based on polyaniline as the conducting polymer, were used as the two electrodes in a battery. The two electrodes were separated by an insulating sheet of uncoated cellulose soaked with an electrolyte containing 2 M sodium chloride. The open circuit voltage of the battery was found to be 0.8 V.

EXAMPLE 18

An ICP composite material was coated with a 100 nm thick layer of silver using a constant current electrodeposition process in a solution of 0.1 M $AgNO_3$. The resulting surface modified composite material was combined with another unmodified composite material in a battery in which the electrodes were separated by an insulating sheet of uncoated cellulose soaked with an electrolyte containing 2 M sodium chloride. The open circuit voltage of this battery was found to be 1.0 V.

EXAMPLE 19

An ICP composite material was electrochemically modified by the electrodeposition of an additional layer of polypyrrole from a solution containing 0.5 M sodium p-toluene sulfonate. The thickness of the electrodeposited layer was 50 nm and the composite material was shown by elemental analysis to exchange mainly cations when the polypyrrole layer was oxidized and reduced electrochemically. The resulting composite material was subsequently used as an electrode in a battery together with another composite material which had been electrochemically coated with a 50 nm thick layer of $SnO_2$. In this battery, the electrodes were separated by an insulating sheet of uncoated cellulose soaked with an electrolyte containing 1 M $LiPF_6$ dissolved in a 2:1 mixture of ethyl carbonate and diethyl carbonate. The open circuit voltage of the battery was found to be 3.5 V.

EXAMPLE 20

An ICP composite material obtained by dip coating polypyrrole onto a large surface area polypropylene substrate was used as an electrode material for electrochemically controlled batch-wise extraction of anions from solutions. The composite electrode could be used for 100 repeated extraction and desorption experiments without significant loss of performance.

EXAMPLE 21

In the present experiments, the influence of the type of oxidant on anion exchange properties of fibrous *Cladophora* cellulose/polypyrrole composites was examined. *Cladophora* algae were collected from the Baltic Sea. The cellulose was extracted from *Cladophora* algae as described previously (Mihranyan et al, *International Journal of Pharmaceutics*, 269:433 (2004)). Pyrrole (Py), iron chloride ($FeCl_3$), phosphomolybdic acid (PMo) hydrate, sodium chloride and hydrochloric acid were used as supplied by VWR, Sweden. DL-aspartic acid (99%), DL-glutamic acid (98%) and sodium p-toluene sulfonate (95%) were purchased from Sigma Aldrich. 300 mg of cellulose powder was dispersed in 50 ml of water using high energy-ultrasonic treatment (Vibra-Cell 750W, Sonics, USA) for 8 minutes, and the dispersion was collected on a filter paper. 3 ml of Py was put in a volumetric flask and the total volume was brought to 100 ml. The collected cellulose cake was mixed with Py solution and redispersed by ultrasonication for 1 min. The dispersion was next allowed to stand for 30 min and was then collected on a filter paper. 8 g of iron (III) chloride was dissolved in 100 ml of water and run through the filter cake to induce polymerization (the reaction was allowed to continue for 10 min prior to filtration). A fluffy sponge-like cake was formed. 100 ml of 0.1 M HCl was subsequently run through the cake. The product was then thoroughly washed with water and dried (the cake was redispersed using ultrasonication to form a homogeneous layer). A similar procedure was used to prepare PMo synthesized composites by using PMo rather than iron (III) chloride as the oxidant. For that purpose, 34 g of PMo was dissolved in 100 ml of water and run through the filter cake to induce polymerization. No HCl was, however, run through the cake during the production of the PMo synthesized sample.

Figure 15:
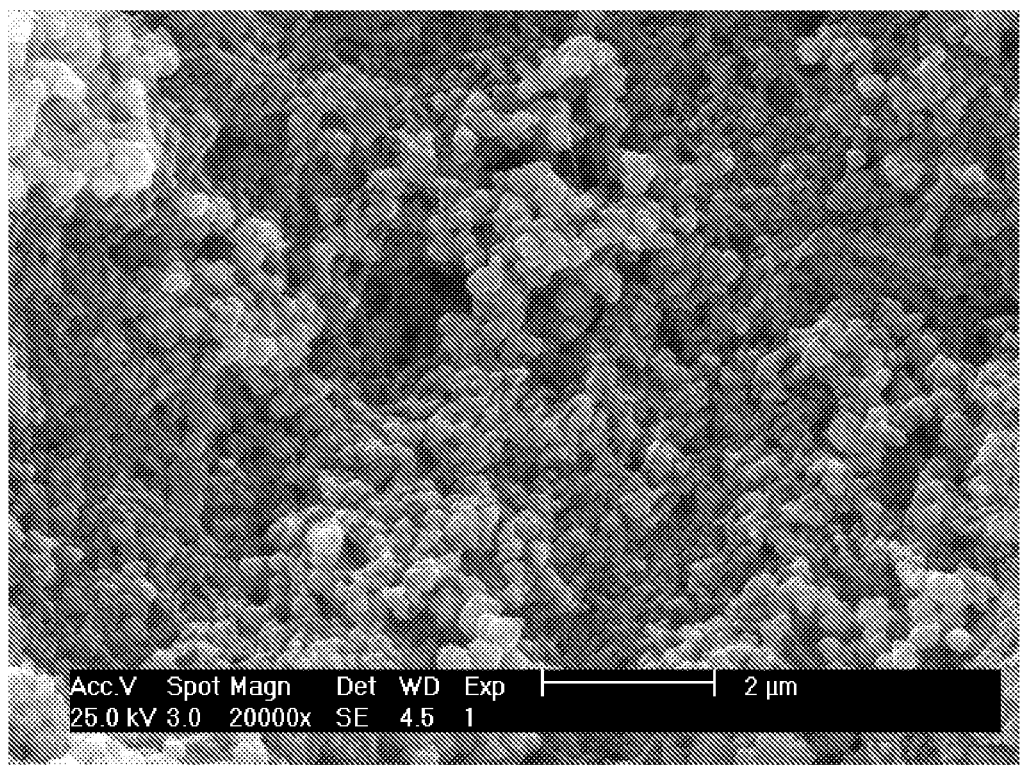
FIG. 15 shows a SEM micrograph of a PPy/*Cladophora* cellulose composite polymerized in the presence of phosphomolybdate (PMo) anions.
Figure 16:
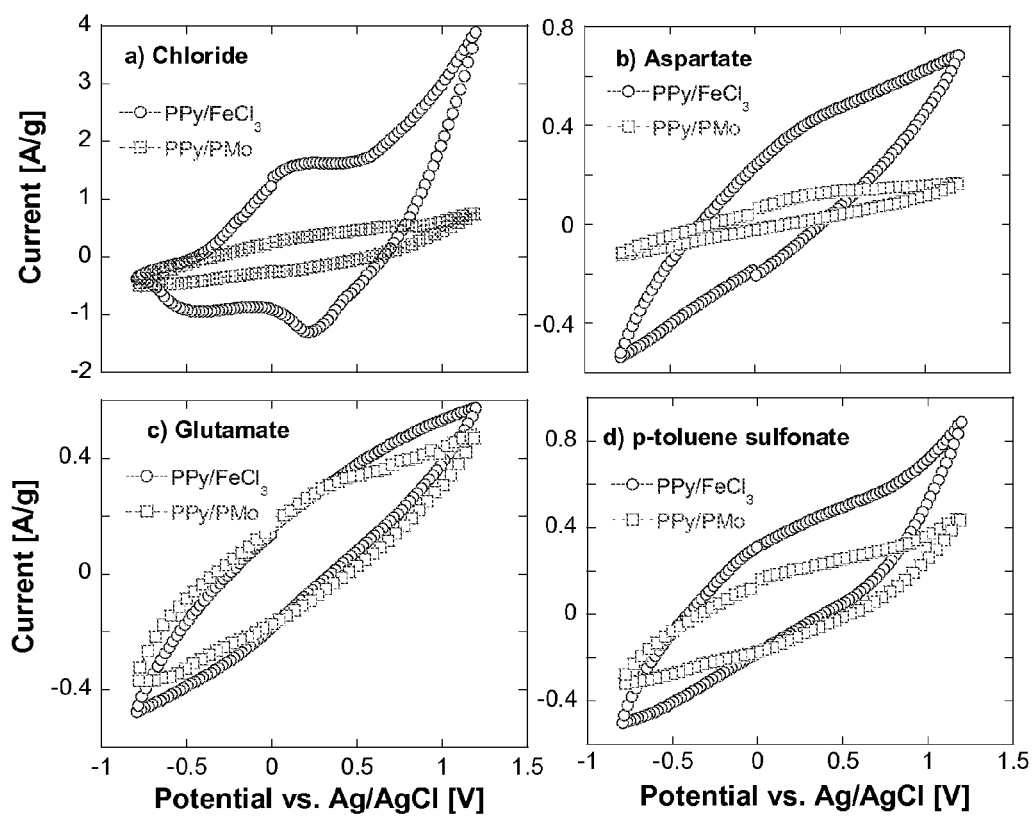
FIGS. 16a-16d show cyclic voltammograms of PPy/*Cladophora* cellulose composites synthesized with iron (III) chloride and PMo, respectively, recorded at a scan rate of 4.5 mV/s in 2.0 M solutions of a) chloride, b) aspartate, c) glutamate and d) p-toluene sulfonate. The current was normalized with respect to the mass of the samples used as the working electrode. A three-electrode set-up with a platinum counter electrode and an Ag/AgCl reference electrode was used. The displayed potential is given vs. the Ag/AgCl reference electrode.

FIG. 15 shows SEM images of the PMo synthesized composite. The iron (III) chloride synthesized sample (FIG. 2) displays the fine fibril structure which is typical for *Cladophora* cellulose. For the PMo synthesized composites, this fibril structure does not seem to be fully preserved as the samples exhibit a more nodular cauliflower like morphology (FIG. 15). From TEM images of iron (III) chloride and PMo synthesized samples, the PPy layer covering the cellulose fibrils is found to be approximately 50 nm thick for both samples, thus creating fibers with a diameter slightly larger than 100 nm. The measured specific surface areas of the iron (III) chloride and PMo synthesized samples were 58.8 and 31.3 $m^2/g$, respectively, while the corresponding total pore volumes were 0.186 and 0.128 $cm^3/g$. The conductivity of the iron (III) chloride synthesized sample was 0.65 S/cm whereas the corresponding value for the PMo synthesized sample was 0.12 S/cm.

Cyclic voltammograms recorded for the two sample types under study in electrolytes containing chloride (a), aspartate (b), glutamate (c), and p-toluene sulfonate (d) are displayed in FIGS. 16*a*-16*d*. In these voltammograms, the current was normalized with respect to the mass of the composite material used as the working electrode in the experiments. The shapes of the voltammograms clearly differ for the two samples as well as for different electrolytes with the same type of sample. For all electrolytes, the current was found to be higher for the iron (III) chloride synthesized samples than for the PMo synthesized ones. This suggests that the transport rate of the ions were lower in the PMo samples as a result of a more compact structure in good agreement with the SEM micrographs in FIGS. 2 and 15. In the chloride containing electrolyte, oxidation and reduction peaks are clearly seen for the iron (III) chloride synthesized sample while the shape of the corresponding voltammogram for the PMo sample indicates that the current was limited by the (higher) resistance associated with this sample. The fact that less well-defined voltammograms were obtained for the iron (III) chloride samples in the three other electrolytes can be explained by the lower conductivities of these electrolytes. This effect also explains the more positive peak potentials in these solutions for both samples. It can thus be concluded that the peak potentials and shape of the voltammograms depend both on the conductivity of the sample and that of the electrolyte. To minimize the effects of the ohmic drop, the samples used as the working electrode were therefore kept as small as possible.

Figure 17:
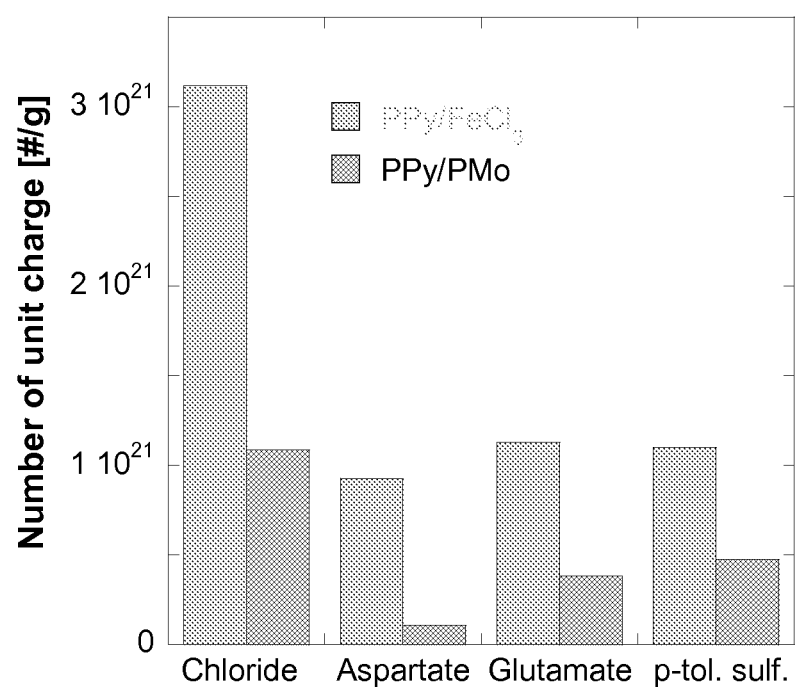
FIG. 17 shows number of unit charges participating in the oxidation process at an oxidation potential of +0.9 V normalized with respect to the sample mass. For experimental details, see Example 21.
Figure 18:
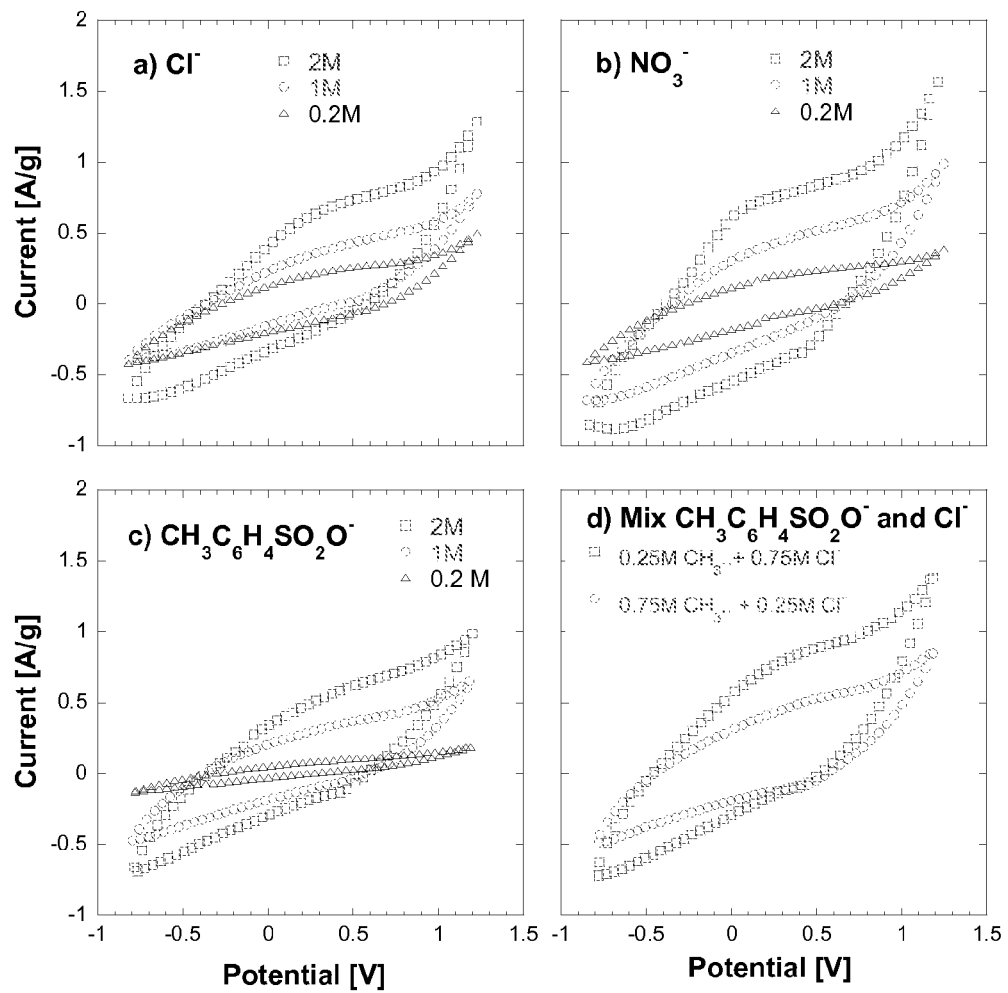
FIGS. 18a-18d show cyclic voltammograms recorded at a scan rate of 5 mV/s, in electrolytes containing a) $Cl^-$ions, b) $NO_3^-$ions, c) $CH_3C_6H_4SO_2O^-$ ions and d) mixes of $CH_3C_6H_4SO_2O^-$ and $Cl^-$ ions at the displayed concentrations. The measured current was normalized with respect to the sample weight. For experimental details, see Example 22.

To visualize the different anion extraction behavior of the iron(III) chloride and PMo synthesized materials, the number of unit charges participating in the oxidation process at an oxidation potential of +0.9 V has been plotted as a function of anionic species in FIG. 17. It is clearly seen that the number of ions absorbed by the iron (III) chloride synthesized sample was higher than for the PMo sample for all ions, most likely due to the almost two times larger surface area of the former sample. It is, however, also seen that the relative yield for the PMo sample was better for the largest p-toluene sulfonate ions than for chloride. This indicates that the PMo sample is better suited for the extraction of larger ions.

In FIG. 17 it is also seen that while the iron (III) chloride synthesized sample did not seem to discriminate between the three types of larger anions (the normalized values are roughly the same for all three types), the corresponding results for the PMo synthesized sample differed. The value for the largest p-toluene sulfonate ions was thus 4.4 times higher than the value for aspartate and 1.2 times larger than the value for glutamate for the PMo sample. The different values obtained for these ions with the PMo synthesized sample may be explained by different degrees of extraction of the ions within the bulk of the material. For the iron (III) chloride sample, these larger ions probably reside mainly on the surface of the material. This would explain the almost equal values obtained with the latter material for aspartate, glutamate and p-toluene sulfonate, as well as the higher value found for chloride (which readily should be able to enter into the bulk of the material) than for the larger ions.

As already indicated, the different ion extraction properties for the iron (III) chloride and the PMo synthesized samples depicted in FIG. 17 are due to the very different size of the anions used in the polymerization reactions. The phosphomolybdate anion has been reported to form clusters with sizes of 10-11 Å, which means that the vacancies created when this sample is reduced (and the phosphomolybdate anion leaves the sample) is expected to be larger than the size of the p-toluene sulfonate anion (i.e. the largest anion used in this study). The fact that the ratio between the p-toluene sulfonate and chloride values was significantly higher for the PMo sample also clearly shows that the PMo sample is better suited for the extraction of larger ions than the iron (III) chloride synthesized sample. The latter should be particularly useful in extractions of large anions from solutions also containing small anions. It can thus be concluded that the surface area of the composite should be as large as possible to ensure a large contact area with the solution. Further, the size of the anion used in the polymerization step should be chosen in proportion to the size of the molecule to be extracted to ensure both a large absorption capacity and selectivity.

It can be concluded from this example that the fine fibril structure, typical for *Cladophora* cellulose, was preserved for the iron (III) chloride synthesized sample whereas the PMo synthesized sample exhibited a more nodular cauliflower-like morphology. For both samples, the PPy layer covering the cellulose fibrils was found to be about 50 nm thick thus giving rise to composite fibers with a diameter slightly larger than 100 nm. It was established that the surface area of the iron (III) chloride synthesized sample was almost twice as large as that of the PMo synthesized sample. Both samples absorbed significantly higher amounts of chloride ions as compared to the larger anions investigated. The number of absorbed ions per sample mass was larger for the iron (III) chloride synthesized sample than for the PMo synthesized sample for all four electrolytes studied, whereas the latter showed a higher selectivity towards the largest anions under study.

The large specific surface areas of the presented materials entail a considerable absorption capacity for large anions, a feature that is useful in biotechnological applications involving extraction of proteins, DNA and other biomarkers. When tailoring this type of large surface area fibrous composites for ion extraction, the size of the anion used in the polymerization step as well as the surface area should be optimized by one skilled in the art according to the teachings herein.

EXAMPLE 22

The present experiments investigate the anion absorption properties of the conductive paper-like composite material consisting of PPy and *Cladophora* sp. algae cellulose as a function of anion size and anion concentration and the behaviour of the composite material in solutions containing more than one anionic species. A composite material was produced according to the procedure outlined in Example 1.

Cyclic voltammetry and chronoamperometry (potential step) measurements were performed in a standard three-electrode electrochemical cell utilizing an Autolab/GPES interface (ECO Chemie, The Netherlands) with the composite material as the working electrode, a Pt wire as the counter electrode and an Ag/AgCl electrode as the reference electrode. The composite material samples used in the experiments typically had a length of 5-10 mm, a width of 3-5 mm and a thickness of 1-2 mm. The weight of each sample was approximately 10-20 mg. The measurements were carried out in NaCl (0.2-5M), $KNO_3$ (0.2-2M) and sodium p-toluene sulfonate, $CH_3C_6H_4SO_3Na$, (0.2-2M) solutions at room temperature. The cyclic voltammetry measurements were performed in the potential region between −0.8 and 1.2 V employing a scan rate of 5 mV/s. In the chronoamperometric measurements, the potential was stepped between −0.8 and +0.7 V. Prior to the experiments, all samples were reduced for 300 s at −0.8 V in a 1.0 M NaCl solution (to remove the chloride ions originating from the polymerization step from the material). The samples were thereafter moved to the experimental electrolyte where the measurements were initiated immediately.

Cyclic voltammograms recorded in electrolytes containing various concentrations (i.e. 0.2-2 M) of $Cl^-$ ions (a), $NO_3^-$ ions (b), and $CH_3C_6H_4SO_2O^-$ ions (c) as well as two different mixtures of $CH_3C_6H_4SO_2O^-$ and $Cl^-$ ions (d) are displayed in FIGS. 18a-18d.

Chronoamperometric measurements showed that nitrate ions are slightly more effortlessly incorporated in the composite material than chloride ions, whereas the composite capacity to host large p-toluene sulfonate ions is about 50% compared to that of the smaller ions at the oxidation conditions used in the present study. The results also indicate that the anions were able to physically cover most of the composite surface before diffusing into the bulk of the polymer at sufficiently high electrolyte concentrations and that the distance between surface sites closely matched the sizes of the anions. In mixtures containing both chloride and p-toluene sulfonate ions it was found that high concentrations of the larger p-toluene sulfonate anion may hinder the transport of chloride ions into the composite while low concentrations, on the other hand, may facilitate the transport. The present results clearly show that the combination of the thin polymer coating and the large specific surface area of the composite gives rise to a high ion absorption capacity, even for large anions. This demonstrates that the present material is well-suited for use in biotechnological applications involving, e.g., desalting and extraction of proteins and DNA from biological samples.

EXAMPLE 23

Figure 19:
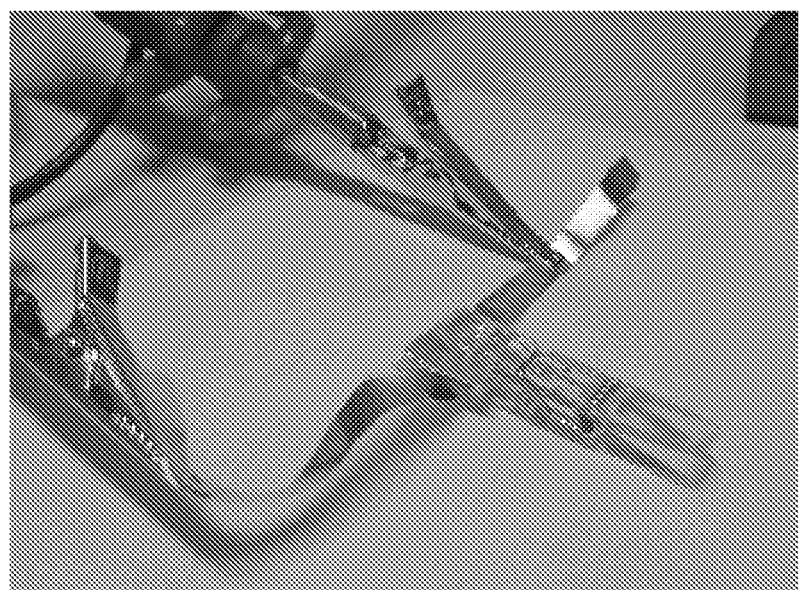
FIG. 19 shows an electrochemical cell (battery) consisting of composites moulded into paper sheets with a Whatman filter paper soaked in a 2M potassium nitrate solution located between the composites. The composites are contacted with aluminium foils.

Two identical ICP composite materials based on polypyrrole as the conducting polymer and *Cladophora* cellulose as the substrate, were used as two electrodes in a battery as shown in FIG. 19. The two electrodes were separated by an insulating sheet of Whatman filter paper soaked with an electrolyte containing 2 M potassium nitrate. The open circuit voltage of the battery was found to be 1 V.

The composite materials, methods, and devices of the present invention have been described with reference to specific embodiments and the Examples demonstrate various specific aspects of the invention. However, it will be appreciated that additional embodiments, aspects, variations and modifications of the invention can be effected by a person of ordinary skill in the art without departing from the scope of the invention as claimed.

What is claimed is:

1. A composite material in the form of a continuous structure and comprising a continuous intrinsically conducting polymer (ICP) coating layer polymerized on a substrate formed of a plurality of cellulose nanofibers, wherein the composite material is porous and has a surface area of at least 10 $m^2/g$, and the coating layer has a thickness less than 250 nm.

2. The composite material according to claim 1, the composite material having a surface area of at least 15 $m^2/g$.

3. The composite material according to claim 1, wherein the ICP layer coated on the substrate has a thickness less than 100 nm.

4. The composite material according to claim 1, wherein the substrate has a surface area of at least 40 m²/g.

5. The composite material according to claim 1, wherein the substrate comprises at least about 50% by weight of a microfibrillated cellulose.

6. The composite material according to claim 1, wherein the substrate comprises at least about 50% be weight of cellulose fibers selected from algal cellulose and bacterial cellulose.

7. A composite material in the form of a continuous Structure and comprising a continuous intrinsically conducting polymer (ICP) coating layer Polymerized on a substrate, the composite material having a surface area of at least 10 m²/g, wherein the substrate comprises at least about 50% by weight of cellulose is derived from *Cladophora* sp. green algae.

8. The composite material according to claim 5, wherein the composite material has been formed into a paper-like sheet.

9. The composite material according to claim 1 in which the substrate has been made conductive by functionalization with carbon nanomaterials or by depositing a thin conducting layer onto the substrate.

10. The composite material according claim 1, wherein the ICP is a derivative of acetylene.

11. The composite material according to claim 1, wherein the ICP is selected from the group consisting of polyphenylene (PPh), polyphenylene sulfide (PPhS), polyphenylene vinylene (PPhV), polypyrrole (PPy), polythiophene, and polyaniline (PANI).

12. A composite material in the form of a continuous structure and comprising a continuous intrinsically conducting polymer (ICP) coating layer polymerized on a substrate, the composite material having a surface area of at least 10 m²/g, wherein the substrate comprises at least about 50% by weight of a cellulose derived from *Cladophora* sp. green algae and the ICP comprises a polypyrrole.

13. The composite material according to claim 1, wherein the substrate comprises at least about 50% by weight of a microfibrillated cellulose and the ICP comprises a polypyrrole.

14. The composite material according to claim 1, wherein the substrate has a crystallinity index of at least 50%.

15. An electrochemical or electrical device, comprising the composite material according to claim 1.

16. An energy storage device, comprising a battery or a supercapacitor formed of the composite material according to claim 1.

17. A method of manufacturing the composite material according to claim 1, the method comprising polymerizing an ICP-forming monomer on the cellulose nanofiber substrate to form a coating layer of the ICP.

18. A method according to claim 17, wherein the ICP-forming monomer is applied to the cellulose nanofibers in a solution including an oxidizing agent.

19. The method according to claim 18, further comprising applying controlled potential or current electropolymerization to increase the thickness of the ICP coating layer.

20. The composite material according to claim 7, wherein the ICP coating layer has a thickness les than 500 nm.

21. The composite material according to claim 7, wherein the ICP coating layer has a thickness less than 250 nm.

22. The composite material according to claim 1, wherein the substrate has a surface area of at least 20 m²/g.

23. The composite material according to claim 1, wherein the composite material has a surface area of at least 20 m²/g.

24. A composite material in the form of a continuous structure and comprising a continuous intrinsically conducting polymer (ICP) coating layer polymerized on a substrate and having a thickness less than 250 nm, the composite material having a surface area of at least 20 m²/g and porosity, with a majority of pores having a size of between 10 and 100 nm.

25. The composite material according to claim 24, having a thickness less than 100 nm.

26. The composite material according to claim 1, wherein the substrate has crystallinity.

* * * * *

UNITED STATES PATENT AND TRADEMARK OFFICE
CERTIFICATE OF CORRECTION

PATENT NO. : 8,920,971 B2
APPLICATION NO. : 12/743796
DATED : December 30, 2014
INVENTOR(S) : Stromme et al.

It is certified that error appears in the above-identified patent and that said Letters Patent is hereby corrected as shown below:

In the Claims

Claim 7, Column 29, Lines 10-11, change "Structure" to --structure--.

Claim 7, Column 29, Line 12, change "Polymerized" to --polymerized--.

Claim 7, Column 29, Line 15, delete "is".

Claim 20, Column 30, Line 20, change "les" to --less--.

Signed and Sealed this
Seventh Day of April, 2015

Michelle K. Lee
*Director of the United States Patent and Trademark Office*